United States Patent [19]

Kojima

[11] Patent Number: 5,454,052
[45] Date of Patent: Sep. 26, 1995

[54] METHOD AND APPARATUS FOR CONVERTING HALFTONE IMAGES

[75] Inventor: Akio Kojima, Neyagawa, Japan

[73] Assignee: Matsushita Electric Industrial Co., Ltd., Osaka, Japan

[21] Appl. No.: 44,827

[22] Filed: Apr. 8, 1993

[30] Foreign Application Priority Data

| Apr. 9, 1992 | [JP] | Japan | 4-088540 |
| Sep. 30, 1992 | [JP] | Japan | 4-261145 |

[51] Int. Cl.⁶ ............ G06K 9/00
[52] U.S. Cl. ............ 382/233; 358/456; 382/266
[58] Field of Search ............ 382/54, 50, 52, 382/27, 22; 358/456, 467, 443; 348/399, 254, 438

[56] References Cited

U.S. PATENT DOCUMENTS

| 4,758,897 | 7/1988 | Hiratsuka et al. | 358/283 |
| 4,841,377 | 6/1989 | Hiratsuka et al. | 358/283 |
| 4,876,610 | 10/1989 | Ohsawa et al. | 358/443 |
| 4,878,125 | 10/1989 | Katayama et al. | 358/443 |
| 4,972,500 | 11/1990 | Ishii | 382/50 |
| 5,130,820 | 7/1992 | Hirota | 358/447 |
| 5,153,925 | 10/1992 | Tanioka et al. | 382/52 |
| 5,157,741 | 10/1992 | Katayama | 382/54 |
| 5,271,064 | 12/1993 | Dhawan et al. | 382/54 |

FOREIGN PATENT DOCUMENTS

| 58-014673 | 1/1983 | Japan | H04N/1/41 |
| 63-013578 | 1/1988 | Japan | H04N/1/40 |
| 2170373 | 7/1986 | United Kingdom | H04N/1/40 |

OTHER PUBLICATIONS

Gonzalez, *Digital Image Processing*, Addison–Wesley, pp. 189–201, 315–320, 368–371, and 414–429, (1992).

H. S. Hou, *Digital Document Processing*, John Wiley & Sons, Inc., pp. 26–33 (1983).

*Primary Examiner*—Leo H. Boudreau
*Attorney, Agent, or Firm*—Ratner & Prestia

[57] ABSTRACT

The edge feature value of a M-valued original image is detected and converted to an N-valued image (where M>N) using an error diffusion method while suppressing the quantization error in edge areas of the image by edge area enhancement. The N-valued image data is scanned with a edge feature value detection filter to detect feature quantities and is scanned by plural spatial filters with different smoothing characteristics to normalize the output value of each spatial filter to a specific value. The normalized outputs of the spatial filters are weighted with a weighting coefficient based on the edge feature value to generate the interpolated image data, and the resulting image is normalized to L-valued image data (where N<L). The mixing ratio and image quality are also controlled by manipulating the edge feature value and weighting coefficients.

14 Claims, 15 Drawing Sheets

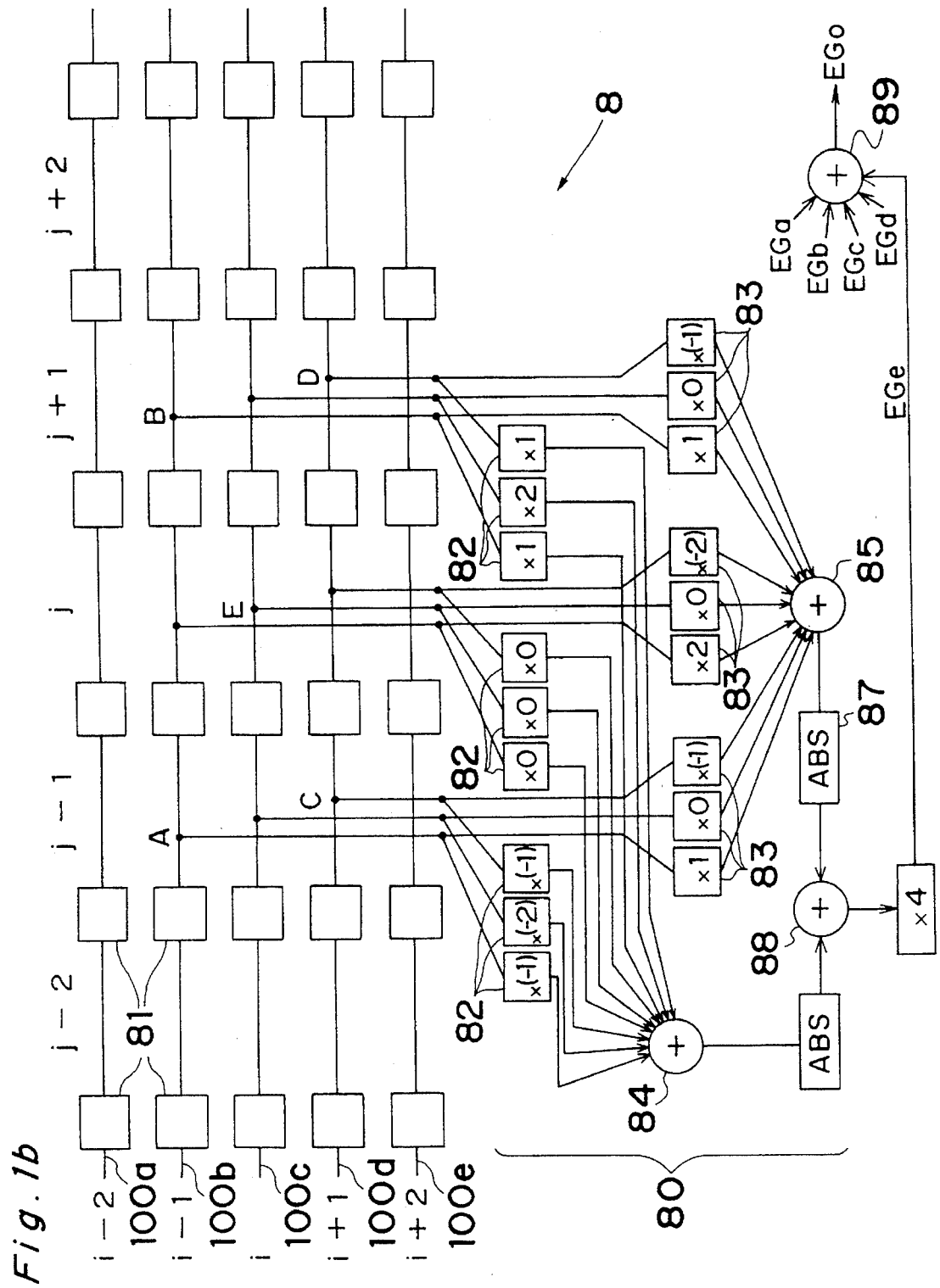

Fig.8a

IN FEATURE EXTRACTION 19a

WEIGHTING

| 1 | 2 | 1 |
|---|---|---|
| 0 | 0 | 0 |
| -1 | -2 | -1 |

| -1 | 0 | 1 |
|---|---|---|
| -2 | 0 | 2 |
| -1 | 0 | 1 |

× ×

INPUT

| 0 | 1 | 1 |
|---|---|---|
| 1 | 0 | 0 |
| 1 | 1 | 0 |

| 0 | 1 | 1 |
|---|---|---|
| 1 | 0 | 0 |
| 1 | 1 | 0 |

= =

PRODUCT

| 0 | 2 | 1 |
|---|---|---|
| 0 | 0 | 0 |
| -1 | -2 | 0 |

| 0 | 0 | 1 |
|---|---|---|
| -2 | 0 | 0 |
| -1 | 0 | 0 |

↓ ↓

OUTPUT

| | | |
|---|---|---|
| | \|0\| | |
| | | |

| | | |
|---|---|---|
| | \|-2\| | |
| | | |

METHOD AND APPARATUS FOR CONVERTING HALFTONE IMAGES

BACKGROUND OF THE INVENTION

1. Field of the Invention

The present invention relates to a method and apparatus for converting halftone images, specifically for converting K-value images to N-value images (where K>N), and N-value images to M-value images (where N<M).

2. Description of the Prior Art

Multi-valued data is increasingly used for data output in both printing and display devices. When the image information reproduced by these devices is electronically manipulated, there is a rapid increase in the data volume. Source images are digitized for transmission, storage, and processing by facsimile machines, still-image filing systems, photocopiers, and other image processing devices. When these digitized images are reproduced by the output device without any post-digitizing processing, image deterioration becomes a problem.

This image deterioration problem is commonly resolved today by transmitting, storing, or processing the digitized source signal, and converting this digital signal to a multi-valued gradation signal at the tame of reproduction by the output device.

Various methods are used to express image density in a digital signal, including dithering and error diffusion. Halftone estimating methods are used to restore these pseudo-halftone images to multi-valued signals. Halftone estimating methods are described in Japanese patent laid-open number S58-14673 relating to a gradation signal demodulation method, U.S. Pat. No. 4,758,897 relating to a Method and Apparatus for Estimating Halftone Images from Binary Images, and Japanese patent laid-open number H2-181278 relating to a method and apparatus for image processing. With these methods plural scanning apertures are used and one of the scanning apertures is selected based on the matching/mismatching of the dot pattern observed through the scanning aperture with a reference pattern used to evaluate the text/image area. Alternatively, the scanning aperture may be selected based on the spectrum distribution of the dots in the scanning aperture. The image halftones are then estimated based on the number of black pixels in the selected aperture.

With these methods, however, text and image areas in the source image are separated based on the dot pattern in the aperture, and methods which completely change the scanning aperture based on this dot pattern evaluation tend to accentuate the effect of evaluation errors in the output image, resulting in image deterioration. A further problem is that continuous adjustment of the desired image quality is not possible.

SUMMARY OF THE INVENTION

Therefore, an object of the present invention is to provide a superior method and apparatus for converting halftone images enabling optimum gradation conversion of both image edge and halftone areas, and enabling continuous adjustment of the desired image quality.

To achieve this object, the halftone conversion processing method of the invention extracts the edge feature value or the feature quantity, of the input N-value image data, and generates interpolated image data from the output of plural spatial filters with different smoothing or evaluation characteristics according to the extracted edge feature value, thereby converting the N-value image data to M-value image data (where N<M).

This halftone conversion processing method is further characterized by controlling the edge feature value to adjust the image resolution.

In addition, the halftone conversion processing apparatus achieving this object according to the present invention comprises an extraction means for extracting the edge feature value of the input N-valued image data; plural spatial filters with different smoothing ranges or weighting coefficients for smoothing the N-valued image data; a normalization means for normalizing the outputs of the plural spatial filters to predetermined levels; and a mixing means for converting the N-valued image data to M-valued image data (where N< M) by generating interpolated image data from the plural normalized outputs of the normalization means according to the edge feature value output by the extraction means.

This halftone conversion processing apparatus may further comprise an entry means for inputting a resolution adjustment value, and a control means for controlling the mixing ratio of the plural normalized outputs or the edge feature value based on the output from the entry means to adjust the image resolution.

This halftone conversion processing apparatus may further comprise a conversion processing means for converting K-valued image data to N-valued image data (where K> N) using an error diffusion method, and a suppression means for suppressing diffusion of quantization errors occurring in the conversion of K-valued image data to N-valued image data (where K>N) in the conversion processing means.

This suppression means further comprises an edge enhancement means for enhancing the edge area of the input image data; an edge detection means for detecting the edge area of the input image data; and a second mixing means for mixing the input image data and the edge enhancement means output at a predetermined ratio according to the output of the edge detection means, and outputting the K-valued image data.

This halftone conversion processing apparatus may further comprise an entry means for inputting the resolution adjustment value, and a second control means for controlling the mixing ratio of the second mixing means according to the output from the entry means to adjust the image resolution.

The halftone conversion processing apparatus according to the present invention converts N-valued image data to M-valued image data (where N<M) by extracting the edge feature value of the input N-valued image data, normalizing the outputs of plural spatial filters with different smoothing coefficients, and generating interpolated image data from the plural normalized outputs according to the edge feature value.

As a result, switching between binary values is not used in the interpolated image data combining the outputs of plural spatial filters with different smoothing coefficients. This makes it possible to suppress the effects of recognition errors to an extremely low level. Because the outputs of different spatial filters are continuously interpolated, fewer spatial filters are needed.

Continuous image quality adjustment is also enabled by entering a resolution adjustment value and controlling the edge feature value or mixing ratio of the plural normalized outputs according to the entered value.

By converting K-valued image data to N-valued image data (where K>N) by means of error diffusion processing, and generating the M-valued image data from this N-valued image data (where N< M), gradation conversion processing of image data stored with density information is also possible, and pseudo-contours (ghosts) and deterioration of edge line resolution can be prevented. In addition, by providing a suppression means comprising an edge enhancement means for enhancing the edge area of the input image data, an edge detection means for detecting the edges of the input image data, and a second mixing means for mixing the input image data and the edge enhancement means output according to the output of the edge detection means and outputting the K-valued image data, the K-valued image data can be output without enhancing noise in halftone areas of the input image data by enhancing the edges of the input image. By generating this K-valued image data before the conversion processing stage and inputting the K-valued image data, diffusion of quantization error at the edges can be suppressed effectively.

Continuous image quality adjustment is also possible because a resolution adjustment value can be entered and the mixing ratio of the second mixing means is controlled by the second control means according to the entered adjustment value.

By means of the present invention, it is therefore possible to assure optimized gradation conversion of both edge and halftone areas of an image, and a superior method and apparatus for converting halftone images enabling free image quality adjustment can be achieved.

BRIEF DESCRIPTION OF THE DRAWINGS

The present invention will become more fully understood from the detailed description given below and the accompanying diagrams wherein.

DESCRIPTION OF PREFERRED EMBODIMENTS

A first embodiment of a halftone images converting apparatus according to the present invention is described below with reference to FIGS. 1a–5.

Figure 1A:
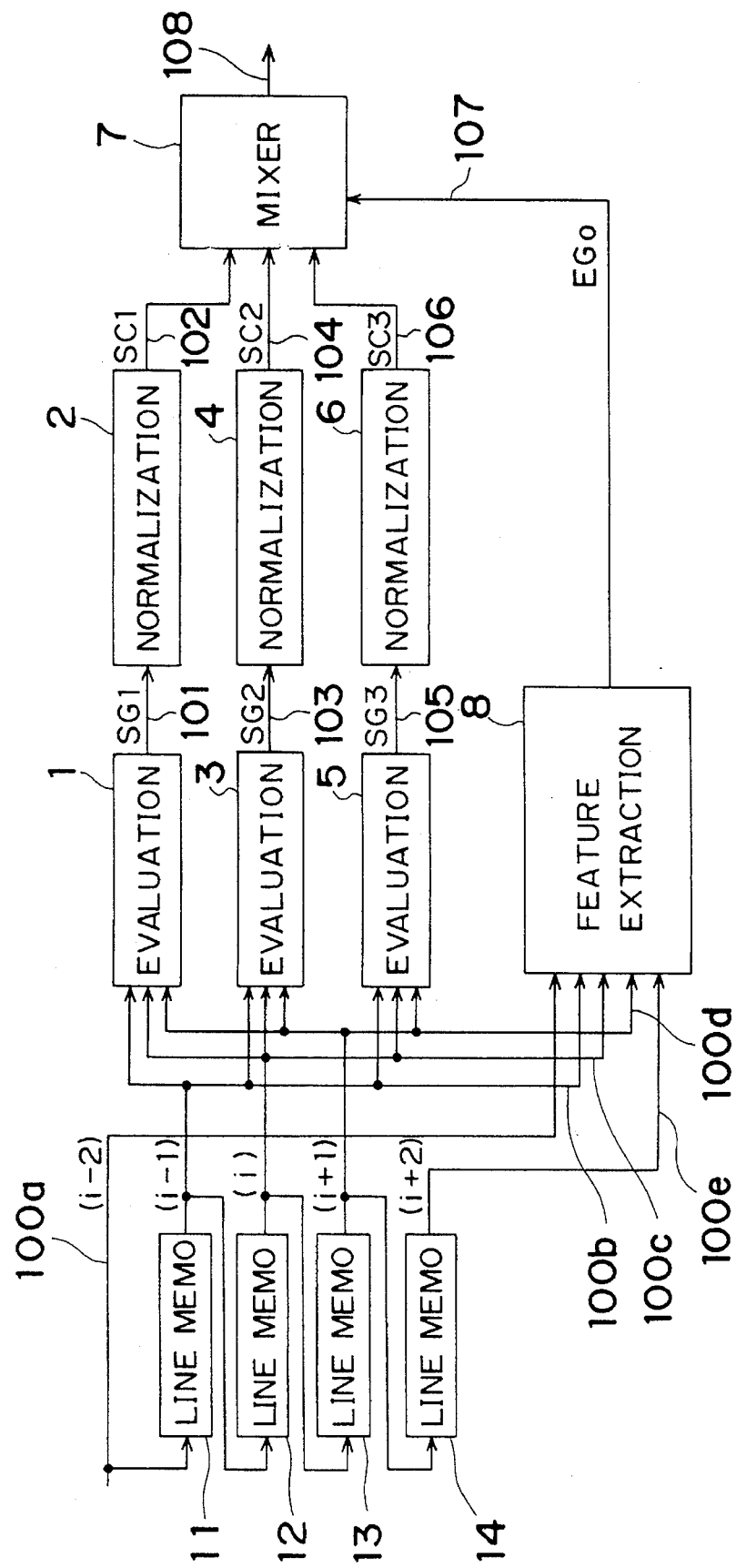
FIG. 1a is a block diagram of a halftone conversion processing apparatus according to the first and third embodiments of the present invention.

In FIG. 1a, four line memories 11, 12, 13, and 14 are provided, each delays one line of the N-valued (such as binary) image data on line 100a and generates a delayed line data. Thus, along line 100a real time (i-2)th line data is produced, and along lines 100b–100e, delayed (i-1)th, ith, (i+1)th and (i+2)th image data are produced.

The image data along lines 100a–100e are all applied to a feature extraction circuit 8 which is shown in detail in FIG. 1b, and the delayed image data along lines 100b–100d are applied to the first, second, and third evaluation circuits 1, 3, and 5, respectively, for producing evaluation values SG1, SG2 and SG3, respectively.

Figure 2:
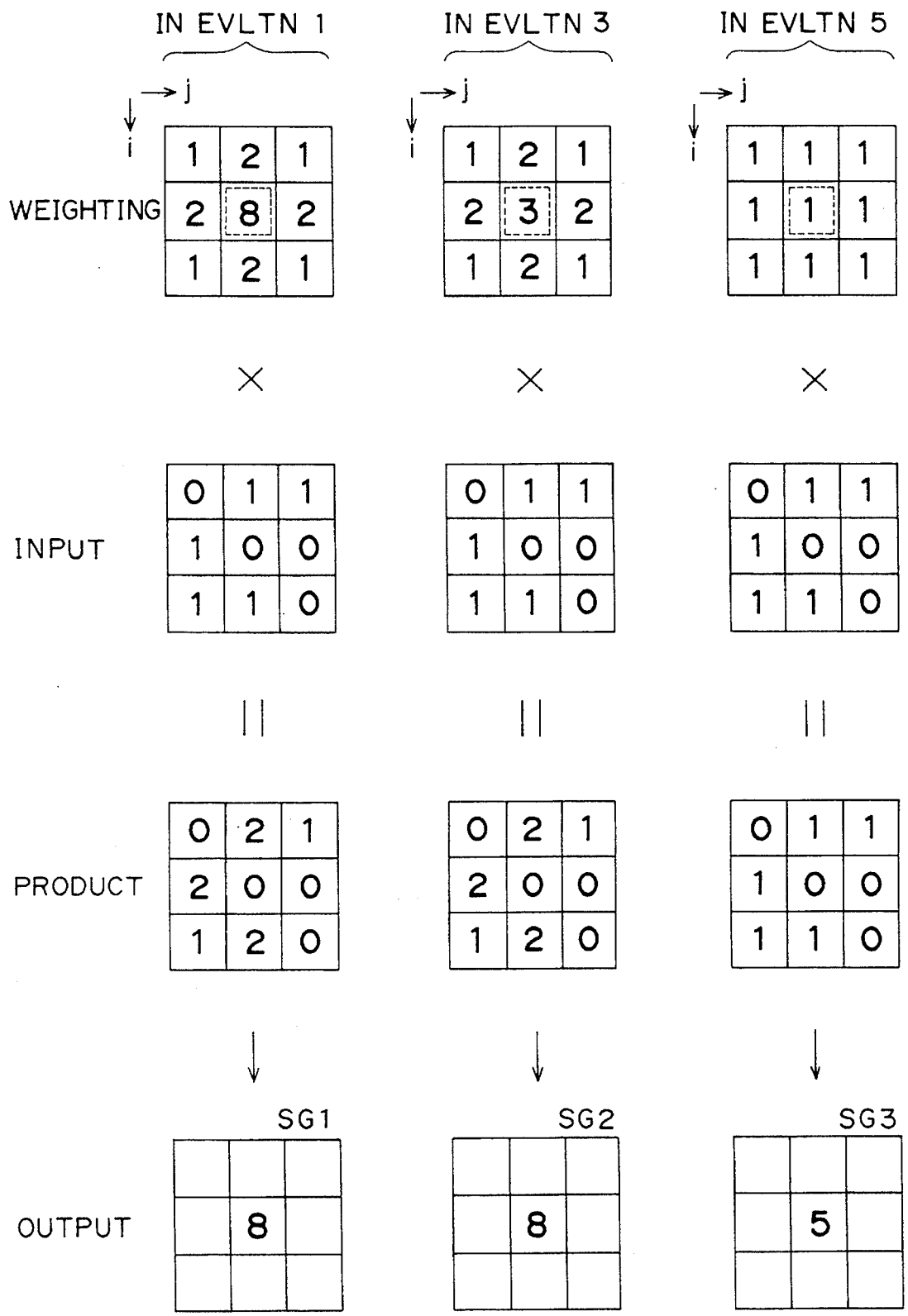

As shown in FIG. 2, each of the evaluation circuits 1, 3, and 5 are previously provided with spatial filters having weighting coefficients distributed in a window covering a predetermined number of pixels, such as 3×3 (=9) pixels, and the center pixel shown by a dotted line is a target pixel. The N-valued (such as binary) input image data of the same size as the window is taken up so that each input pixel data is multiplied by the corresponding weighting coefficient. The result of the multiplication is shown as a product in FIG. 2. Then, the values in the window are added to obtain an evaluation value, which is eight in the case shown in FIG. 2 for the first evaluation circuit 1. The obtained evaluation value is used as an evaluation value of the target pixel. In this manner each pixel is evaluated with the use of surrounding pixel data. The circuit for obtaining the evaluation value is similar to the circuit shown in FIG. 1b of the feature extraction circuit 8.

As shown in FIG. 2, the evaluation circuits 1, 3, and 5 have different weighting coefficients. Thus, if the input data are all ones within the window, the maximum evaluation values 20, 15 and 9 will be produced from the evaluation circuits 1, 3 and 5, respectively. Thus, in order to properly evaluate the evaluation values from circuits 1, 3 and 5, the evaluation values SG1, SG2 and SG3 should be normalized by dividing the evaluation values by the corresponding maximum evaluation values.

Referring back to FIG. 1a, a first normalization circuit 2 divides the first evaluation value SG1, according to the above example, by 20 and multiplies the quotient by a predetermined number (M-1) to obtain an M-Valued (256 level) image data, which is also referred to as a normalized evaluation value SC1. Thus, according to the above example, $$SC1=SG1\times(255/20)$$

is carried out in the first normalization circuit 2.

Similarly, in second and third normalization circuits 4 and 6, $$SC2=SG2\times(255/15)$$

$$SC3 = SG3 \times (255/9)$$

are carried out.

Referring to FIG. 1b, the feature extraction circuit 8 for extracting the features proximal to the target pixel of the N-valued (binary) image data is shown. Before the description of the circuit arrangement of the feature extraction circuit 8, its function is first explained.

Figure 4A:
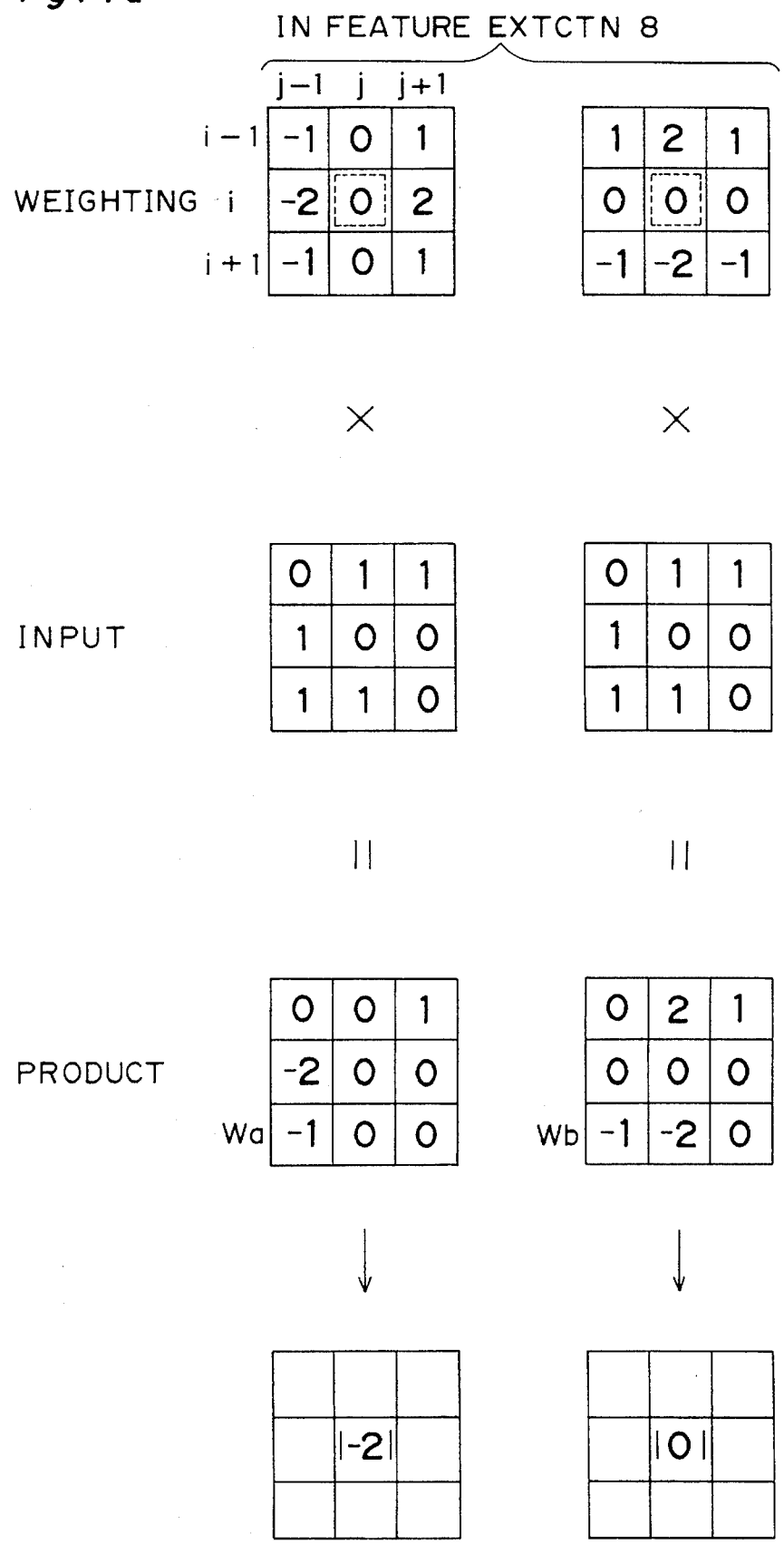
Figure 4B:
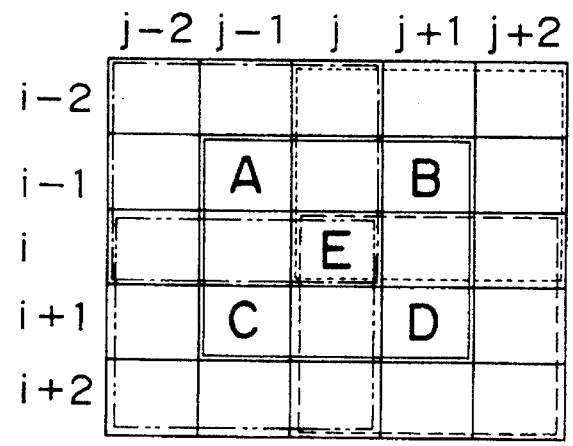

As shown in FIG. 4b, the feature extraction circuit 8 uses five windows, a main window and four sub-windows. Each of the five windows has 3×3 pixel size. The main window has a center target pixel at location E, and the four sub-windows have their center target pixel at locations A, B, C and D.

Each of the five windows in the feature extraction circuit 8 is previously provided with two sets of weighting coefficients distributed in the window, as shown in FIG. 4a. The center pixel shown by a dotted line is a target pixel. The description below is particularly directed to the main window.

The first set, shown in the left hand side in FIG. 4a, is used for extracting the horizontal edge feature (H-edge feature), so that the weighting coefficients aligned vertically at the center are set to zero. Similarly, the second set, shown in the right hand side in FIG. 4a, is used for extracting the vertical edge feature (V-edge feature), so that the weighting coefficients aligned horizontally at the center are set to zero. The N-valued (binary) input image data of the same size as the window is taken up so that each pixel data is multiplied by the corresponding coefficient. The result of the multiplication is shown as a product in FIG. 4a. Then, the values in the window are added to obtain an edge feature value, which is −2 in the case shown in the left hand side in FIG. 4a. The absolute values of the obtained H-edge feature value, which is |−2|, and the V-edge feature value, which is |0|, are added to obtain an edge feature value EGe (=2).

In a similar manner, edge feature values EGa, EGb, EGc and EGd are obtained from the sub-windows. All the edge feature values are added to obtain a total edge feature value EGo (which is also referred to as an edge appearance signal) as follows.

$$EGo = EGa + EGb + EGc + EGd + 4EGe$$

Referring now to FIG. 1b, the feature extraction circuit 8 has a plurality of shaft registers 81 connected in series to each of lines 100a–100e. In FIG. 1b, only a circuit for obtaining the edge feature value EGe is shown. Nine outputs from nine shift registers 81 aligned 3×3 with a line E at the center are connected to nine multipliers 82 and further to an adder 84, and are also connected to nine multipliers 83 and further to an adder 85. The nine multipliers 82 serve as the first set of weighting coefficients (spatial filter frequencies), and the nine multipliers 83 serve as the second set of weighting coefficients. The sum from adder 84 is applied to an absolute circuit 86 and further to an adder 88. Similarly, the sum from adder 85 is applied to an absolute circuit 87 and further to the adder 88. Thus, adder 88 produces the edge feature value EGe.

Although not shown in FIG. 1b, the feature extraction circuit 8 further has four additional circuits similar to circuit 80. The first additional circuit connected to nine outputs from nine shift registers 81 aligned 3×3 with a line A at the center for producing the edge feature value EGa. The second additional circuit connected to nine outputs from nine shift registers 81 aligned 3×3 with a line B at the center for producing the edge feature value EGb. The third additional circuit connected to nine outputs from nine shift registers 81 aligned 3×3 with a line C at the center for producing the edge feature value EGo. And the fourth additional circuit connected to nine outputs from nine shift registers 81 aligned 3×3 with a line D at the center for producing the edge feature value EGd.

The five edge feature values EGa–EGe are added at adder 89 to produce the total edge feature value EGo.

It is noted that, instead of five windows, two windows, window E and one additional window can be used. One additional window may have the same size as window E, but with different weighting coefficients, or may have a size different from the size of window E, as in the second embodiment.

Figure 3:
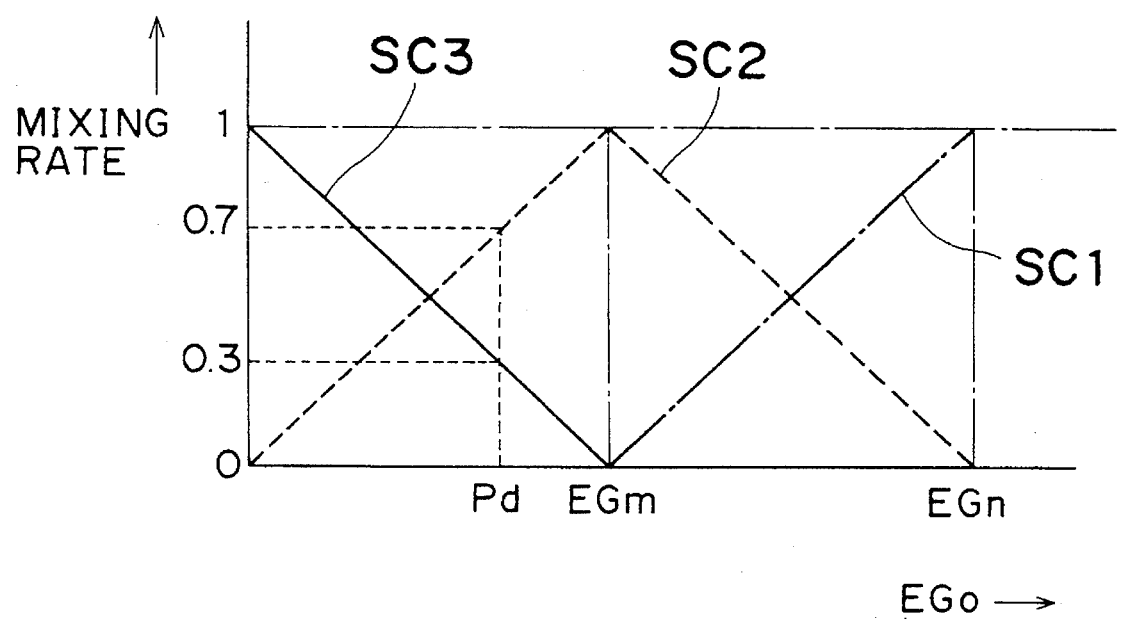

Referring back to FIG. 1a, the halftone images converting apparatus according to the present invention further has a mixing circuit 7 which mixes the M-valued normalized image data signals SC1, SC2 and SC3 according to the output signal total edge feature value EGo. As shown in FIG. 3, a rate of mixing the signals SC1, SC2 and SC3 are show by broken line, dotted line and real line, respectively. In a first range which is from zero to a preselected point EGm signals SC2 and SC3 are mixed, in a second range which is from EGm to a preselected point EGn signals SC1 and SC2 are mixed, and in a third range which is EGn afterwards only the signal SC1 is used.

For example, if the detected total edge feature value EGo is at point Pd, signals SC2 and SC3 are mixed at the rate of 0.7 to 0.3.

Figure 1C:
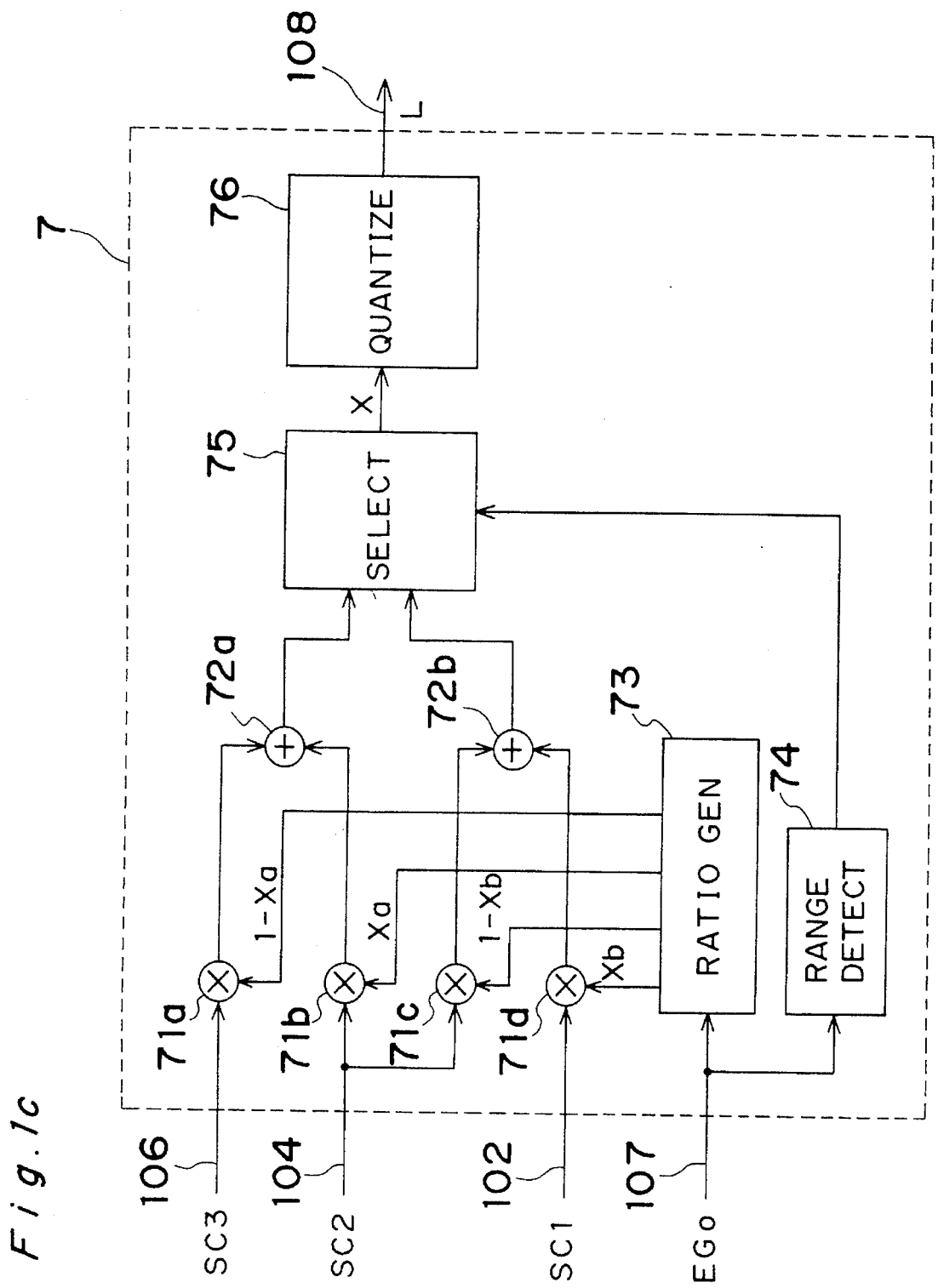
FIG. 1b is a block diagram of the feature extraction circuit used in the apparatus of FIG. 1a, FIG. 1c is a block diagram of the mixing circuit used in the apparatus of FIG. 1a, FIG. 2 is a series of tables used to describe the evaluation circuits in FIG. 1a, FIG. 3 is an operating diagram of the mixing circuit 7 in FIG. 1a, FIG. 4a is a series of tables used to describe the feature extraction circuit in FIG. 1a, FIG. 4b is a table showing areas for extracting the edge feature by the feature extraction circuit.

Referring to FIG. 1c, a detail of the mixing circuit 7 is shown. The mixing circuit 7 includes multipliers 71a–71d, adders 72a–72b, ratio generator 73 for generating the mixing ratio, a range detector 74 for detecting one of the first, second and third ranges, a selector 75 for selecting mixed signal between SC2–SC3 mixed signal and SC1–SC2 mixed signal, and quantization circuit 76 in which the selected signal is guantized to L-valued data.

The operation of the halftone conversion processing apparatus thus comprised is described below.

It is to be noted that the values N, M, and L can be any value, but in the present embodiment, the values N=2, M=256, and L=256 are used by way of example only.

The first, second, and third evaluation circuits 1, 3, and 5 generate evaluation values SG1, SG2 and SG3, respectively, using the weighting coefficients shown in the first row in FIG. 2. The evaluation values SG1, SG2 and SG3, are obtained using equations 1, 2, and 3, respectively, for a target pixel value P(i,j).

$$SG1 = \begin{aligned} &+1 \times P(i-1,j-1) + 2 \times P(i-1,j) + 1 \times P(i-1,j+1) \\ &+2 \times P(i,j-1) + 8 \times P(i,j) + 2 \times P(i,j+1) \\ &+1 \times P(i+1,j-1) + 2 \times P(i+1,j) + 1 \times P(i+1,j+1) \end{aligned} \quad [1]$$

$$SG2 = \begin{aligned} &+1 \times P(i-1,j-1) + 2 \times P(i-1,j) + 1 \times P(i-1,j+1) \\ &+2 \times P(i,j-1) + 3 \times P(i,j) + 2 \times P(i,j+1) \\ &+1 \times P(i+1,j-1) + 2 \times P(i+1,j) + 1 \times P(i+1,j+1) \end{aligned} \quad [2]$$

$$SG3 = \quad [3]$$

-continued $$+ 1 \times P(i-1,j-1) + 1 \times P(i-1,j) + 1 \times P(i-1,j+1)$$
$$+ 1 \times P(i,j-1) + 1 \times P(i,j) + 1 \times P(i,j+1)$$
$$+ 1 \times P(i+1,j-1) + 1 \times P(i+1,j) + 1 \times P(i+1,j+1)$$

If the number of gradations in the input image is N and the sum of the weighting coefficients in the added areas is Sx, then the maximum output value of Mx is defined by equation [4] in the first, second, and third evaluation circuits 1, 3, and 5.

$$Mx=(N-1)\times Sx \qquad [4]$$

If the sum of weighting coefficients is Sa and the maximum value of the output SG1 is Ma in the first evaluation circuit 1, the value of Ma is limited to Ma=(N−1)×Sa. As a result, if the output value exceeds the value of Ma defined by this equation, the output is clipped to equal Ma, and if the output is a negative value, it is redefined to a value of zero (0). Because the value of N is assumed to be 2 in this embodiment and the first evaluation circuit 1 sum operation is applied based on FIG. 2, first column, the resulting value of Sa is 20. The value of Ma is therefore also 20, and any output value exceeding 20 is clipped to 20. As described above, if the output is negative, it is treated as zero.

Similarly, if the weighting coefficient sum in the second evaluation circuit 3 is Sb and the maximum value of the output SG2 is Mb, Mb=(N−1)×Sb. Since N=2 and the second evaluation circuit 3 operates on the values in FIG. 2, top row, center, Sb=15 and Mb=15.

Similarly, if the weighting coefficient sum in the third evaluation circuit 5 is Sc and the maximum value of the output SG3 is Mc, Mc=(N−1)×Sc. Since N=2 and the second evaluation circuit 3 operates on the values in FIG. 2, top row, right hand side, Sc=9 and Mc=9.

Operation of the first, second, and third normalization circuits 2, 4, and 6 is described next.

The value input to the first, second, and third normalization circuits 2, 4, and 6 is SGx and the maximum input value is the value Mx obtained from equation [4] as described above. Normalization to the M-valued image data SCx is applied using equation [5] where the value within the square bracket [] is rounded to return SCx as an integer.

$$SCx=[SGx\times((M-1)/Mx)] \qquad [5]$$

It is to be noted that the conversion from SGx to SCx can be computed by the CPU based on equation [5] to build a look-up table (LUT) of SGx - SCx correspondence values or an operating circuit.

When the input values obtained by equations [4] and [5] as described above are normalized to the respective M-valued image data, the input value SG1 for the first normalization circuit 2 is normalized to the output value SC1 using equation [6], the second normalization circuit 4 input value SG2 is normalized to the output value SC2 using equation [7], and the third normalization circuit 6 input value SG3 is normalized to the output value SC3 using equation [8]. The maximum values for the input values SG1, SG2, and SG3 are defined as Ma, Mb, and Mc, respectively, and the values within the square brackets [] are rounded to return SCx as an integer.

$$SC1=[SG1\times((M-1)/Ma)] \qquad [6]$$

$$SC2=[SG2\times((M-1)/Mb)] \qquad [7]$$

$$SC3=[SG3\times((M-1)/Mc)] \qquad [8]$$

If the values Ma=20, Mb=15, Mc=9, and M=256 are assumed in this embodiment, and the output values SC1, SC2, and SC3 are calculated for the input values SG1, SG2, SG3, 256 gradation image data is input to the mixing circuit 7.

The value of the weighting coefficients in the first, second, and third evaluation circuits 1, 3, and 5 can be a negative, zero, or positive non-integer (real number) value. Pixels with a coefficient of zero cause the input value to be multiplied by zero, resulting in a zero value being added. If the returned sum is negative, it is treated as zero, and the maximum values are processed to a value as defined by equation [4].

The weighting coefficients and size of the added areas are determined during the design stage with consideration given to the image quality required from the N-valued image data and M-valued image data, or more specifically according to the characteristics of the required spatial filters. As a result, different area sizes can be used even though the same area size is used in this embodiment. It is possible to change the smoothing of the input image data (i.e., the smoothing characteristics of the spatial filter) by changing the weighting coefficients and size of the added areas.

The operation of the mixing circuit 7, particularly shown in FIG. 1c, is described next with reference to FIG. 3.

The mixing circuit 7 weights and adds the input signals SC1, SC2 and SC3 along lines 102, 104, and 106, respectively, using the mixing weight shown in FIG. 3 to mix the signals based on the signal EGo from the feature extraction circuit 8, and outputs the mixed image data signal X along 108.

This mixing operation is based on equation [9] as shown below, wherein Xa and (1-Xa) are the mixing ratio of signal SC2 to SC3, and Xb and (1-Xb) are the mixing ratio of signal SC1 to SC2.

IF $\quad 0 \leq EGo \leq EGm,$         [9]
    THEN $\quad X = (1-Xa) \times SC3 + Xa \times SC2$
                  $Xa = EGo / EGm$
ELSE IF $\quad EGm < EGo,$
    THEN $\quad X = (1-Xb) \times SC2 + Xb \times SC1$
                  $Xb = (EGo - EGm) / (EGn - EGm)$
IF $\quad EGn \leq EGo,$ THEN $EGo = EGn.$ The signal mixed according to equation [9] is ultimately converted to L-value gradation image data and output as mixed image data signal X along line 108. If, for example, L=256, then 256-gradation image data is output.

As a result, the mixing circuit 7 weights the plural input signals based on the edge feature value EGo, and generates the interpolated image data by this signal mixing process.

It is to be noted that while the present embodiment mixes three input signals, a similar effect can be obtained by processing two or more input signals. In addition, even more continuous gradation image data can be generated by increasing the added area size or the number of evaluation circuits with different weighting coefficients. It is also simple to execute this weighting operation simultaneously (parallel) for more than three inputs for even more precise interpolation. In addition, the mixing circuit 7 in this embodiment applies linear weighting in the interpolation process, but non-linear weighting can also be used.

As described above, the outputs from plural evaluation circuits with different characteristics can be processed by the mixing circuit 7 to generate a continuous interpolated image using the edge feature value EGo, significantly reducing the effects of recognition errors, e.g., image deterioration in edge areas, when compared with conventional binary selection methods.

Figure 5:
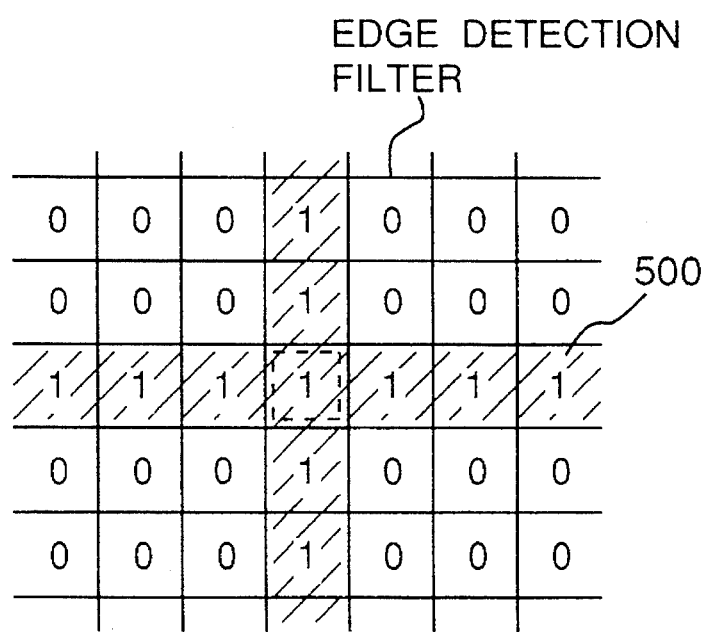
FIG. 5 is a descriptive diagram of the image pattern.

The operation of the feature extraction circuit 8 is described next with reference to FIGS. 1b, 4a, 4b and 5. FIG. 4a is a series of tables used to describe the edge detection falter 80 in FIG. 1b, and FIG. 5 is a descriptive diagram of the image pattern.

The feature value used in the following description refers specifically to the edge feature value near the target pixels. FIG. 4a, first row, left hand side shows the filter used to detect the edge component in horizontal scanning direction j, and FIG. 4a, first row, right hand side shows the filter used to detect the edge component in vertical scanning direction i. The edge feature value at the target pixel E is obtained according to equation [10] where the value of the target pixel E is P(i,j) as shown in FIG. 4b, Wa is the product of the edge component in the vertical scanning direction i, Wb is the product of the edge component in the horizontal scanning direction j, EG is the combined value, and |Wa| and |Wb| are the absolute values of Wa and Wb, respectively.

$$Wa = P(i-1,j-1) + 2 \times P(i-1,j) + P(i-1,j+1) \\ -P(i+1,j-1) - 2 \times P(i+1,j) - P(i+1,j+1)$$ [10]

$$Wb = P(i-1,j+1) + 2 \times P(i,j+1) + P(i+1,j+1) \\ -P(i-1,j-1) - 2 \times P(i,j-1) - P(i+1,j-1)$$

$$EG = |Wa| + |Wb|$$

While the edge feature value EG at the target pixel E is thus obtained by equation [10], the edge feature value EG will be zero when the detection filter scans an image pattern 500 such as that shown in FIG. 5. This area is normally considered to be an internal area of the image and not an edge area, but becomes a problem point for image sharpness in the gradation conversion method of the present embodiment because the specific halftone levels (multivalued data) are obtained by smoothing the input image data by means of predetermined spatial filters.

Detection of this pattern 500 as an edge of a fine line pattern and output of the resulting edge feature value EG is therefore described next. It is assumed that the target pixel is pixel E in FIG. 4b and the position of the target pixel relative to the detection filter is as shown in FIG. 5. The edge detection points in thus case are pixels A, B, C, D, and S in FIG. 4b. The edge feature value is calculated at each detection point using the operation defined in equation [10]. The combined feature (edge) quantity EGo is obtained as $$EGo = EGa + EGb + EGc + EGd + 4EGe$$

where the edge feature value at each detection point A, B, C, D, and E is defined as EGa, EGb, EGc, EGd, and EGe, respectively. The value EGe at target pixel E in this embodiment is therefore EG=24, and this combined EG value is output as the edge feature value EGo.

As the edge feature value EGo increases, the mixing circuit 7 increases the mixing ratio such that SC3<SC2<SC1. This effectively reduces the degree of applied smoothing so that image sharpness is retained. It is therefore possible to suppress pattern 500 smoothing, and loss of sharpness can be suppressed.

As the edge feature value EGo decreases, however, the mixing circuit 7 changes the mixing ratio such that SC1<SC2< SC3. This effectively increases smoothing, resulting in greater smoothness in the input image data. As a result, smoothness is improved in areas with little change in the edge pattern, as in a photograph.

In this way, suitable multivalued processing retaining the edges of the input image can be achieved by treating the edge feature value as the edge component of the input image data, and changing the smoothness of local input image data continuously according to the edge feature value to output multivalued image data of a predetermined number of halftone levels. As a result, multivalued conversion balancing the sharpness required in text and line art areas with the smoothness desired in photographic (halftone) image areas can be achieved. In areas combining text or line art with halftone images, image deterioration caused by recognition errors can be suppressed to an extremely low level because there is no switching between digital spatial filters as in the prior art.

While the present embodiment is described above with the edge feature value being the edge component of the image, the edge feature value shall not be so limited and any edge feature value that can distinguish text areas, halftone image areas, line art areas, edge areas, and other image components can be used. In addition, other methods not shown in the figures can also be used. For example, the difference between the maximum and minimum density levels in a predetermined block can be treated as the edge feature value using the density gradation method, or using a pattern recognition method the primary features obtained using a Laplacian function can be digitized and grouped in blocks to detect the pattern information with the degree of correlation between the detected pattern information and a predetermined reference pattern used as the edge feature value. It is also possible using a combination method to generate an area distribution based on the number of inversions of digitized pixels within a block and the difference (maximum - minimum) in a predetermined block, and use as the edge feature value the percentage of the total area associated with text and the percentage associated with halftone images.

It is also possible to introduce a general recognition method and use the frequency distribution detected using orthogonal conversion or Adamal conversion as the edge feature value, or to obtain the autocorrelation between pixels in an area and use the correlation as the edge feature value. Any of these methods may be used to obtain the edge feature value.

According to the first embodiment of the invention as described above, image deterioration caused by any recognition error in the edge feature value can be suppressed to an extremely low level because plural different spatial filters are interpolated according to the edge feature value and the smoothness characteristic is continuously varied to convert the N-valued image data to M-valued image data without switching between binary spatial filters as in the prior art. In addition, the number of spatial filters required can be reduced because the output of plural different spatial filters is continuously interpolated.

Figure 6:
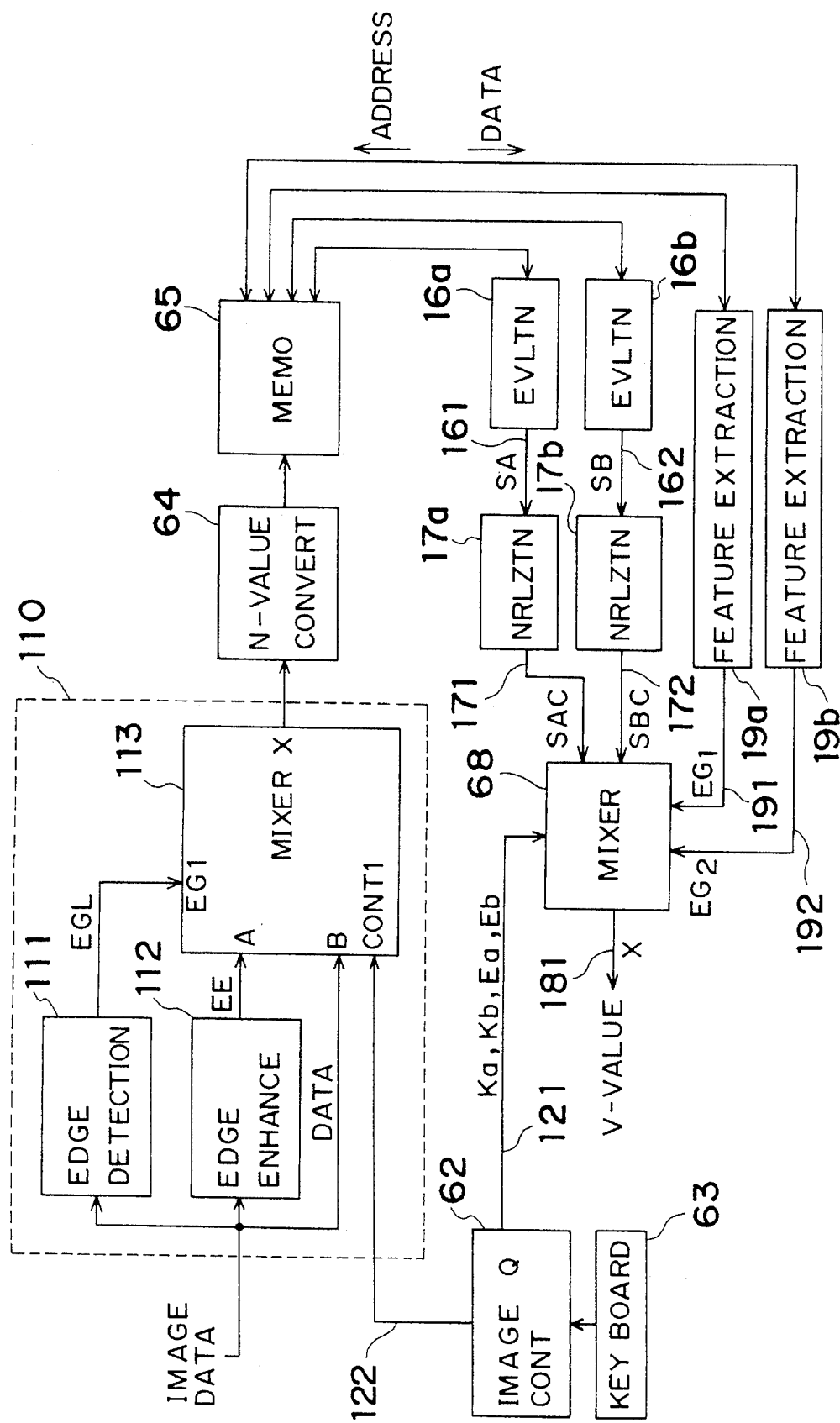
FIG. 6 is a block diagram of a halftone conversion processing apparatus according to the second embodiment of the invention.

Referring to FIG. 6, a second embodiment of a method and apparatus for converting halftone images according to the invention is shown, the halftone conversion processing apparatus according to the second embodiment has an error suppresser 110 which enhances the edge components in the input image data by means of the edge enhancement circuit 112. The edge area of the input image data is detected by the edge detection circuit 111, which outputs signal EGL. The mixing circuit 113 changes the mixing ratio of the input image data Data (input B) and the data EE (input A) output from the edge enhancement circuit 112 based on the input EGL from the edge detection circuit 111, and outputs the K-valued image data X. The mixing ratio of inputs A and B is set by the output CONT1 (signal 122) from the image quality controller 62.

The image quality controller 62 outputs signal CONT1 to the mixing circuit 113 according to the image resolution adjustment value output from the keyboard 63, and outputs signal CONT2 (signal 121) to the mixing circuit 68.

The keyboard 63 comprises, for example, plural keys or buttons whereby a user can enter the desired sharpness level of the image, and outputs the image resolution adjustment values to the image quality controller 62 which in turn produces predetermined control values Ka, Kb, Ea and Eb which will be described later.

The N-value conversion circuit 64 converts the input K-valued image data X to N-valued (such as binary) image data using an error diffusion processing method.

The memory 65 is a semiconductor memory device, hard disk storage medium, or other storage means holding the N-valued image data.

First and second evaluation circuits 16a and 16b produce address signals to the memory 65 which in return produces image data in the designated address to the first and second evaluation circuits 16a and 16b. Similarly, first and second feature extraction circuits 19a and 19b produce address signals to the memory 65 which in return produces image data in the designated address to the first and second feature extraction circuits 19a and 19b.

Figure 7A:
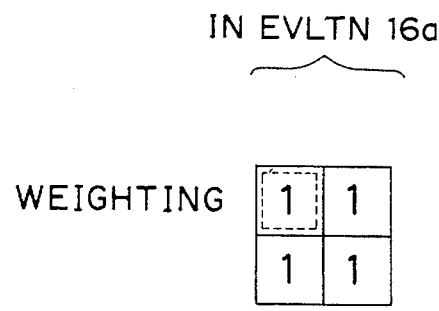
FIGS. 7a and 7b are a series of tables used to describe the evaluation circuits in FIG. 6, FIGS. 8a and 8b are a series of tables used to describe the feature extraction circuits in FIG. 6.
Figure 7B:
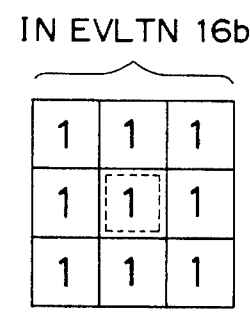

As shown in FIGS. 7a and 7b, each of the evaluation circuits 16a and 16b are previously provided with spatial filters having weighting coefficients distributed in a window covering a predetermined number of pixels, such as 2×2 (=4) pixels for the evaluation circuit 16a and 3×3 (=9) pixels for the evaluation circuit 16b, and the target pixel is shown by a dotted line. The N-valued (such as binary) input image data from memory 65 having the same size as the window of the weighting coefficient is taken up so that each input pixel data is multiplied by the corresponding weighting coefficient. The result of the multiplication is shown as a product in FIGS. 7a and 7b. Then, the values in the window are added to obtain an evaluation value, which is one in the case shown in FIG. 7a for the first evaluation circuit 16a, and five for the second evaluation circuit 16b. The obtained evaluation value, which is generally expressed as SA for the first evaluation circuit 16a and SB for the for the second evaluation circuit 16b, is used as an evaluation value of the target pixel. In this manner each pixel is evaluated with the use of surrounding pixel data. The circuit for obtaining the evaluation value is similar to the circuit shown in FIG. 1b of the feature extraction circuit 8, described above.

As shown in FIGS. 7a and 7b, according to the second embodiment, instead of having different weighting coefficients, the evaluation circuits 16a and 16b have different window size. If the input data are all ones within the window for the first evaluation circuit 16a, the maximum evaluation value 4 will be produced, and for the second evaluation circuit 16b, the maximum evaluation value 9 will be produced. Thus, in order to properly evaluate %he evaluation values from circuits 16a and 16b, SA and SB should be normalized by dividing the evaluation values by the corresponding maximum evaluation values.

Referring back to FIG. 6, a first normalization circuit 17a divides the first evaluation value SA, according to the above example, by 4 and multiplies the quotient by a predetermined number (M-1) to obtain an M-valued (256 level) image data, which is also referred to as a normalized evaluation value SC1. Thus, according to the above example, $$SC1=SG1\times(255/4)$$

is carried out in the first normalization circuit 16a.
Similarly, in second normalization circuits 16b, $$SC2=SG2\times(255/9)$$

is carried out.

Figure 8B:
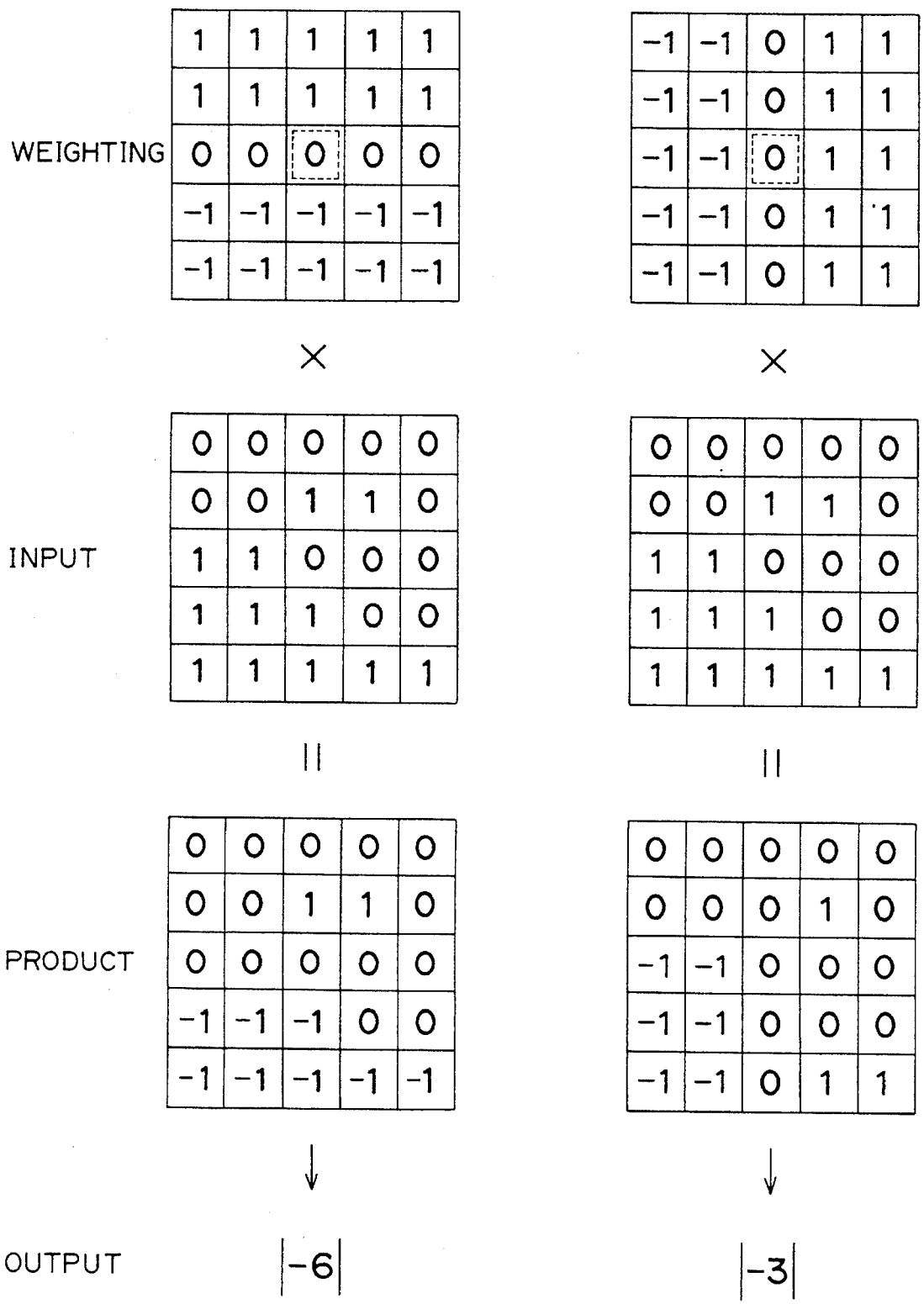

Similar to the first embodiment, the feature extraction circuit 19a uses two sets of weighting coefficients distributed in 3×3 window as shown in FIG. 8a, and the feature extraction circuit 19b uses two sets of weighting coefficients distributed in 5×5 windows as shown in FIG. 8b. The center pixel shown by a dotted line is a target pixel.

The first and second feature extraction circuits 19a and 19b carry out the operation similar to the feature extraction circuit 8 described above, so that the first feature extraction circuit 19a produces a provisional edge feature value EG1 (also referred to as a provisional edge appearance signal), which is equal to 2 in the example shown in FIG. 8a, as calculated below:

$$EG1=|0|+|-2|=2$$

and the second feature extraction circuit 19b produces an edge feature value EG2 (also referred to as a provisional edge appearance signal), which is equal to 9 in the example shown in FIG. 8b, as calculated below:

$$EG2=|-6|+|-3|=9$$

The signals EG1 and EG2 from the first and second feature extraction circuits 19a, 19b are input to the mixing circuit 68, which calculated a total edge feature value EGo in accordance with the following equation:

$$EGo=Ks.Ka.EG1+Kb.EG2$$

wherein Ks is a normalization factor for normalizing the edge feature value obtained from first feature extraction circuit 19a to that obtained from the second feature extraction circuit 19b, and is equal to 20/8 in the case shown in FIGS. 8a and 8b, and Ka and Kb are control values obtained from the image quality control circuit 62 in response to the key operation. Examples of the control values Ka and Kb are shown in Table 1 below under different modes. The mode "Letter" is to emphasize black and white image, and the mode "Photo" is to produce intermediate gray tone. The mode "Mixed L/P" is a mode between two previous modes. Values Ea and Eb are also set by the key operation and are used for setting the boundary between the regions shown in FIG. 9,

TABLE 1

| Mode | Letters | Photo | Mixed L/P |
|------|---------|-------|-----------|
| Ka   | 0.7     | 0.3   | 0.5       |
| Kb   | 0.3     | 0.7   | 0.5       |
| Ea   | 0       | 10    | 5         |
| Eb   | 10      | 20    | 15        |

The operation of the halftone conversion processing apparatus according to the second embodiment will be described below.

The N-valued image data stored in the memory 65 is converted to the L-valued output data 181 is described first with reference to FIGS. 6–9. Note that the relationship of values N and L is defined as N<L.

It is to be noted that the values N, M, and L can be any number but in the present embodiment, the values N=8, M=256, and L=256 are used by way of example.

The evaluation circuit 16a generates the output signal SA using the weighting coefficient shown in FIG. 7a, and evaluation circuit 16b generates the output signal SB using the weighting coefficient shown in FIG. 7b. The signals SA and SB are obtained by equations [11] and [12] assuming a target pixel value of P(i,j).

$$SA = P(i,j) + P(i,j+1) \\ + P(i+1,j) + P(i+1,j+1) \quad [11]$$

$$SB = P(i-1,j-1) + P(i-1,j) + P(i-1,j+1) \\ + P(i,j-1) + P(i,j) + P(i,j+1) \\ + P(i+1,j-1) + P(i+1,j) + P(i+1,j+1)$$

If the number of gradations in the input image is N and the sum of the weighting coefficients in the added areas is Sx, then the maximum output value of Mx is defined by equation [4] in the evaluation circuits 16a, 16b as in the first embodiment above.

If the weighting coefficient sum in the evaluation circuit 16a is Sd and the maximum value of the output SA is Md, Md=(N−1)×Sd. Since N=8 and the evaluation circuit 16a operates on the values in FIG. 7a in the second embodiment, Sd=4 and Md=28.

Similarly, if the weighting coefficient sum in the evaluation circuit 16b is Se and the maximum value of the output SB is Me, Me=(N−1)=Se. Since N=8 and the evaluation circuit 16b operates on the values in FIG. 7b in the second embodiment, Se=9 and Me=63.

The operation of the normalization circuits 17a, 17b is described next.

The value input to the normalization circuits 17a, and 17b is SGx and the maximum input value is the value Mx obtained from equation [4] as described above in the first embodiment. Normalization to the M-valued image data SCx is applied using equation [5] as in the first embodiment where the value within the square brackets [] is rounded to return SCx as an integer.

It is to be noted that the conversion from SGx to SCx can be computed by the CPU based on equation [5] to build a look-up table (LUT) of SGx - SCx correspondence values or an operating circuit, When the input values obtained by equations [4] and [5] as described above are normalized to the respective M-valued image data, the input value SA to normalization circuit 17a is normalized to the output value SAC using equation [13], and the normalization circuit 17b input value SB is normalized to the output value SBC using equation [14]. The maximum values for the input values SA and SB are defined as Md, and Me, respectively, and the values within the square brackets [] are rounded to return an integer.

$$SAC=[SA\times((M-1)/Md)] \quad [13]$$

$$SBC=[SB\times((M-1)/Me)] \quad [14]$$

If the values Md=28, Me=63, and M=256 are assumed in this embodiment, and the output values SAC, and SBC are calculated for the input values SA and SB, 256 gradation normalized image data is input from the normalization circuits to the mixing circuit 68.

Because of the relationship between the weighting coefficients used in the evaluation circuits 16a, 16b, signal 162 (SB) produces greater smoothing than signal 161 (SA), and as a result, the smoothness of signal 172 (SBC) is greater than that of signal 171 (SAC).

Operation of the first and second feature extraction circuits 19a, 19b is described next with reference to FIGS. 8a and 8b.

Assuming a target pixel of P(i,j), the output EG1 of the first feature extraction circuit 19a is calculated using equation [15], and the output EG2 of the second feature extraction circuit 19b is calculated using equation [16].

$$Wa = P(i-1,j-1) + 2\times P(i-1,j) + P(i-1,j+1) \\ -P(i+1,j-1) - 2\times P(i+1,j) - P(i+1,j+1)$$

$$Wb = P(i-1,j+1) + 2\times P(i,j+1) + P(i+1,j+1) \\ -P(i-1,j-1) - 2\times P(i,j-1) - P(i+1,j-1)$$

$$EG = |Wa| + |Wb| \quad [15]$$

$$Wc = P(i-2,j-2) + P(i-2,j-1) + P(i-2,j) + \\ P(i-2,j+1) + P(i-2,j+2) \\ + P(i-1,j-2) + P(i-1,j-1) + P(i-1,j) + \\ P(i-1,j+1) + P(i-1,j+2) \\ - P(i+1,j-2) + P(i+1,j-1) - P(i+1,j) - \\ P(i+1,j+1) - P(i+1,j+2) \\ - P(i+2,j-2) - P(i+2,j-1) - P(i+2,j) - \\ P(i+2,j+1) - P(i+2,j+2)$$

$$Wd = P(i-2,j+2) + P(i-1,j+2) + P(i,j+2) + \\ P(i+1,j+2) + P(i+2,j+2) \\ + P(i-2,j+1) + P(i-1,j+1) + P(i,j+1) + \\ P(i+1,j+1) + P(i+2,j+1) \\ - P(i-2,j-1) - P(i-1,j-1) - P(i,j-1) - \\ P(i+1,j-1) - P(i+2,j-1) \\ - P(i-2,j-2) - P(i-1,j-2) - P(i,j-2) - \\ P(i+1,j-2) - P(i+2,j-2)$$

$$EG2 = |Wc| + |Wd| \quad [16]$$

The output signal EG1 of the first feature extraction circuit 19a is good for detecting small text and fine line patterns, and the output signal EG2 from the second feature extraction circuit 19b is good for extracting contours and edge lines of halftone image areas.

The frequency characteristics of the desired optimum differentiating filter thus differ according to the detected target image, or more specifically according to the characteristics of different image types, including text, photographs, line drawings, and shading. In addition, the characteristics required to eliminate recognition error caused by noise, texturing, and other specific properties of the N-valued image data also differ.

As a result, plural different differentiating filters are combined to obtain the edge feature value in this second embodiment. For example, the extracted edge feature value EGo can be calculated by equation [17] where the edge quantities EG1 and EG2 are the values obtained from equations [15] and [16].

$$EGo=Ks\times Ka\times EG1+Kb\times EG2 \quad [17]$$

The desired edge feature value can be extracted if these coefficients Ka and Kb are controlled according to the target image. Specifically, if the value of (Ks×Ka×EG1) is greater than (Kb×EG2) in EGo, high frequency edge variations can be recognized, and text, fine lines, and similar images can be reliably detected. If, however, the value of (Kb×EG2) is greater than (Ka×Ka×EG1), edge variations with a relatively low frequency can be detected. This latter case is ideal for detecting contours in halftone image areas without detecting textures, shading, and other features in the image.

Primary and secondary differentiating filters can be combined in the combined differentiating filter. It is also possible to switch between differentiating filters, rather than combining the outputs of different filters, according to the detected image features.

It is therefore possible to extract the most significant edge components in text, halftone images, and line art by varying the characteristics of the differentiating filters used to extract the edge feature value according to the target image.

The operation of the mixing circuit 68 is described next with reference to FIGS. 9a and 9b.

Figure 9A:
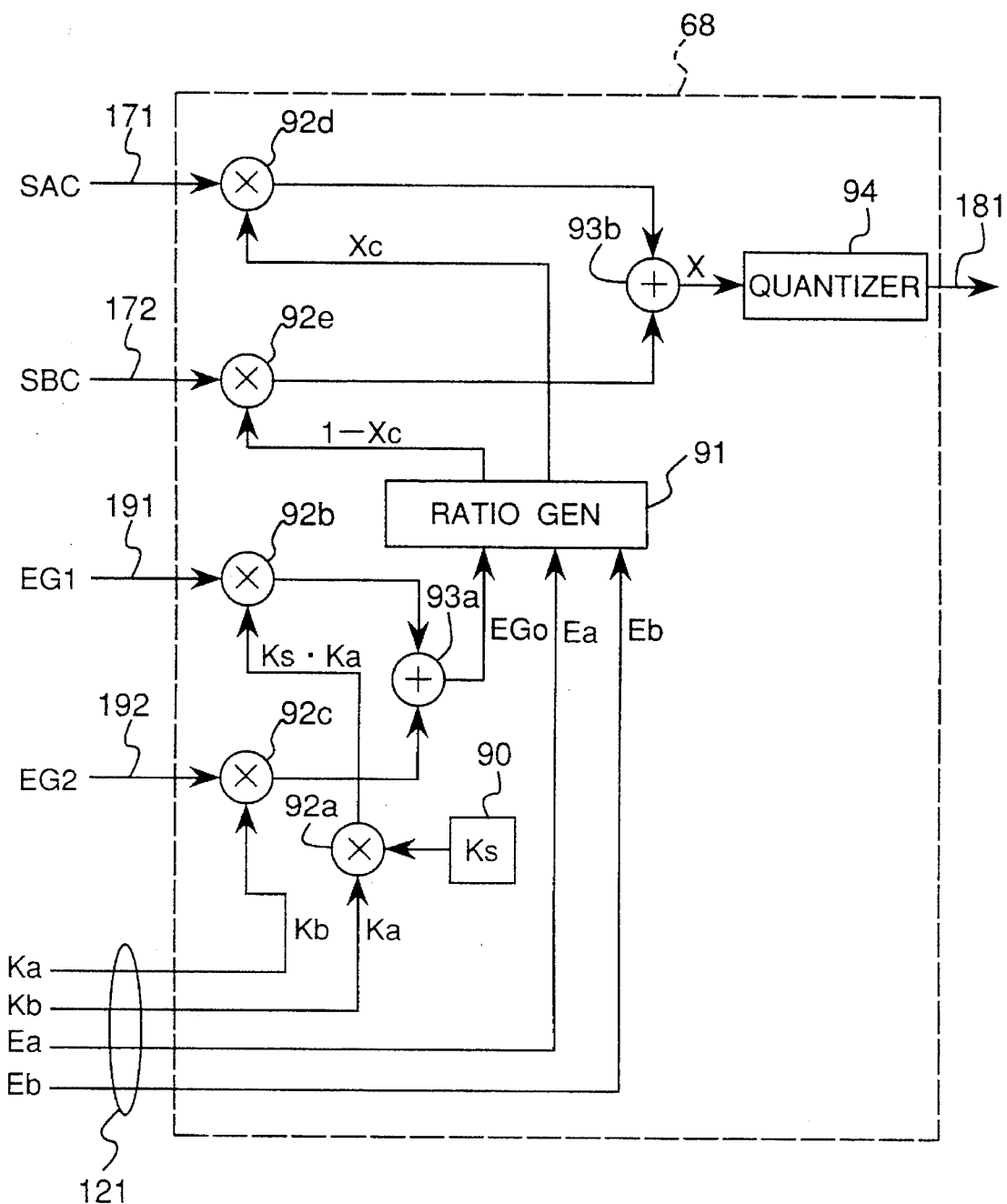
FIG. 9a is a circuit diagram of the mixing circuit 68 in FIG. 6.

Referring to FIG. 9a, the mixing circuit 68 comprises a plurality of multipliers 92a–92e, a plurality of adders 93a and 93b, a normalization factor Ks setting circuit 90, a ratio generator 91 and a quantizer 94. Circuit elements 90, 92a, 92b, 92c and 93a define an adding circuit for adding provisional edge appearance signals EG1 and EG2 at a ratio determined by control values Ka and Kb so as to produce the edge appearance signal EGo. Furthermore, circuit elements 91, 92d, 92e and 93b define a mixer for mixing signals SAC and SBC in accordance with a ratio determined by said ratio generator 91, and produces a mixed image data signal X. The operation of the mixing circuit 68 is described below.

Figure 9B:
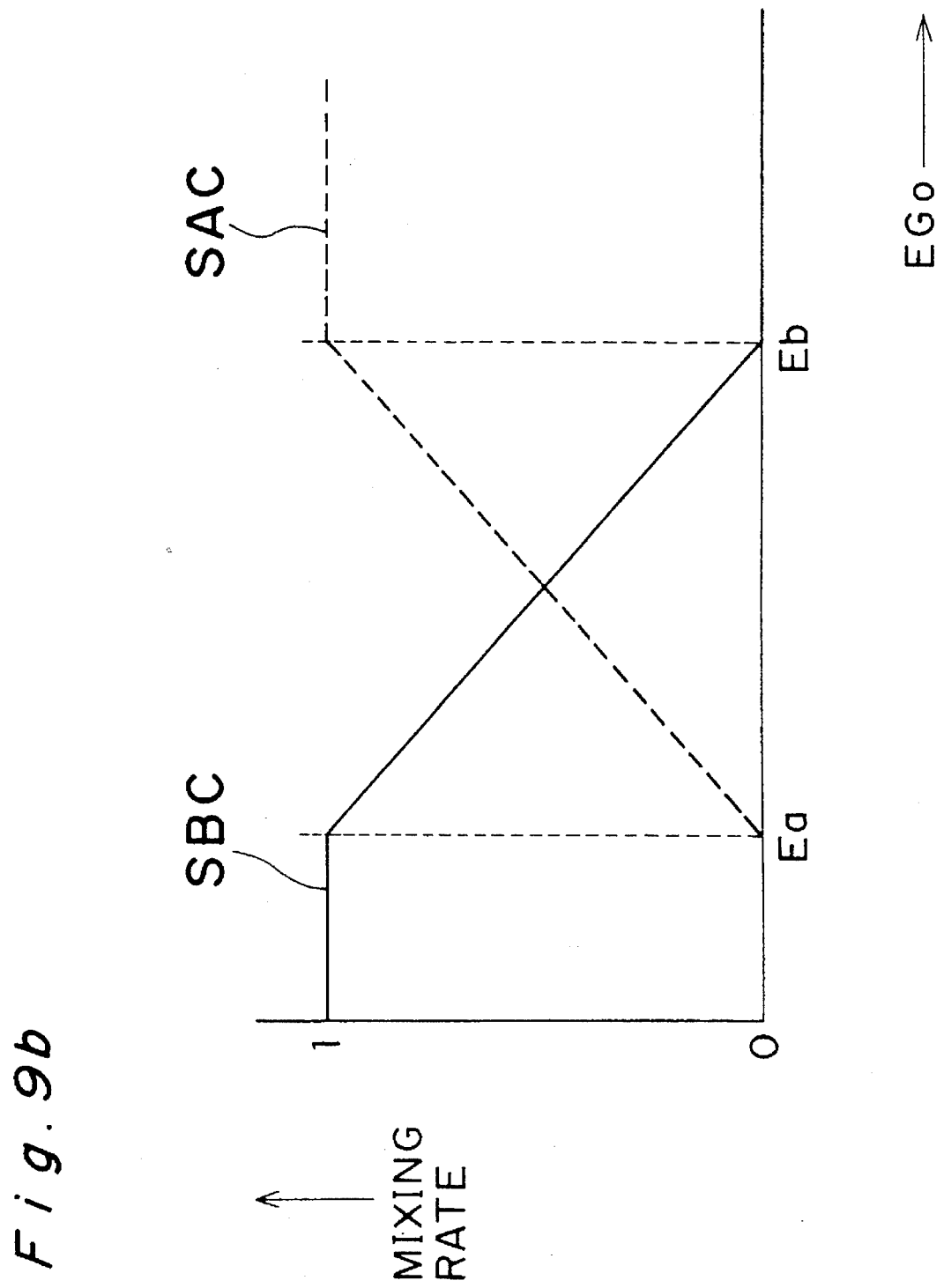
FIG. 9b is an operating diagram of the mixing circuit 68 in FIG. 6.

The mixing circuit 68 weights and adds the input signals SAC, SBC using the mixing rate shown in FIG. 9b to mix the signals based on the signals EG1, EG2 from the first and second feature extraction circuits 19a, 19b, respectively, and outputs the mixed image data signal X along line 181.

This mixing operation is based on equation [18]. The value EGo here is the edge feature value defined by equation [17]. Ea and Eb are the boundary values of the ranges.

$$X = (1-Xc) \times SBC + Xc \times SAC$$

$$Xc = (EGo - Ea)/(Eb - Ea)$$

IF $EGo \leq Ea$, THEN $EGo = Ea$

IF $EGo \geq Eb$, THEN $EGo = Eb$. [18]

The signals mixed according to equation [18] are finally converted to L-halftone image data and output as signal X along line 181. If L=256, the image data is generated with 256 gradations.

The image quality controller 62 controls the boundary values Sa and Eb using the mixing circuit 68, and the control values Ka, Kb for the edge feature value EGo shown in equation [17]. This makes it possible to continuously adjust the resolution.

By the image quality controller 62 increasing the boundary values Ea and Eb, a higher percentage of signal SBC than signal SAC is mixed into the output signal, resulting in improved gradation characteristics because the smoothness of signal SBC is greater than that of signal SAC. This mixing ratio is better suited to processing photographs and other continuous tone images. By decreasing the values Ea and Eb, however, a higher percentage of signal SAC than signal SBC is mixed into the output signal, and resolution is improved because the smoothness of signal SAC is less than that of signal SBC. This mixing ratio is better suited to processing text and line art images. Precise adjustment of the image is made possible by controlling the difference between the values Ea and Eb.

By controlling the coefficients Ka and Kb used to compute the edge feature value EGo (equation [17]), precise adjustment of image resolution is possible. If the value of (Ks×Ka×EG1) is greater than (Kb×EG2) in EGo, high frequency edge variations can be recognized, and text, fine lines, and similar images can be reliably detected. These processing conditions emphasize image resolution. If, however, the value of (Kb×EG2) is greater than (Ks×Ka×EG1), edge variations with a relatively low frequency can be detected. This latter case is ideal for detecting contours in photographic image areas without detecting textures, shading, and other features of the image. These processing conditions emphasize image gradations.

Because N-valued image data is converted to M-valued image data by thus mixing plural signals SAC and SBC with different smoothness characteristics according to the edge feature value EGo in the mixing circuit 68 to continuously adjust the smoothness characteristic of the image and generate the interpolated image data, it is possible to continuously adjust the characteristics (quality) of the generated image by controlling the mixing ratio. By using differentiating filters with different characteristics to extract the edge feature value of the target image, the most significant edge components of the processed image type (text, photograph, line art) can be extracted, and the image resolution can be adjusted as desired by using this edge feature value in the mixing process. Image deterioration caused by recognition errors at a given edge feature value are suppressed to an extremely low level because the mixing circuit 68 does not switch between binary spatial filters as in the prior art.

The keyboard 63 comprises plural keys or buttons for entering a value, and is used to set the image resolution level. This resolution setting is output to the image quality controller 62. The input settings can also be predefined as PHOTOGRAPHIC, TEXT, TEXT & PHOTOGRAPHIC, DITHERED, and other meaningful modes for semi-automatic resolution selection. The image quality controller 62 is, for example, a CPU or other microprocessor chip that calculates the control values (boundary values Ea, Eb and control values Ka, Kb) used by the mixing circuit 68, and outputs the control signal 121 (CONT2). This CONT2 signal enables continuous adjustment of the image resolution in the mixing circuit 68.

As thus described, the image resolution can be continuously adjusted by the mixing circuit 88 by controlling the boundary values Ea, Eb or the control values Ka, Kb of the edge feature value EGo.

Figure 10:
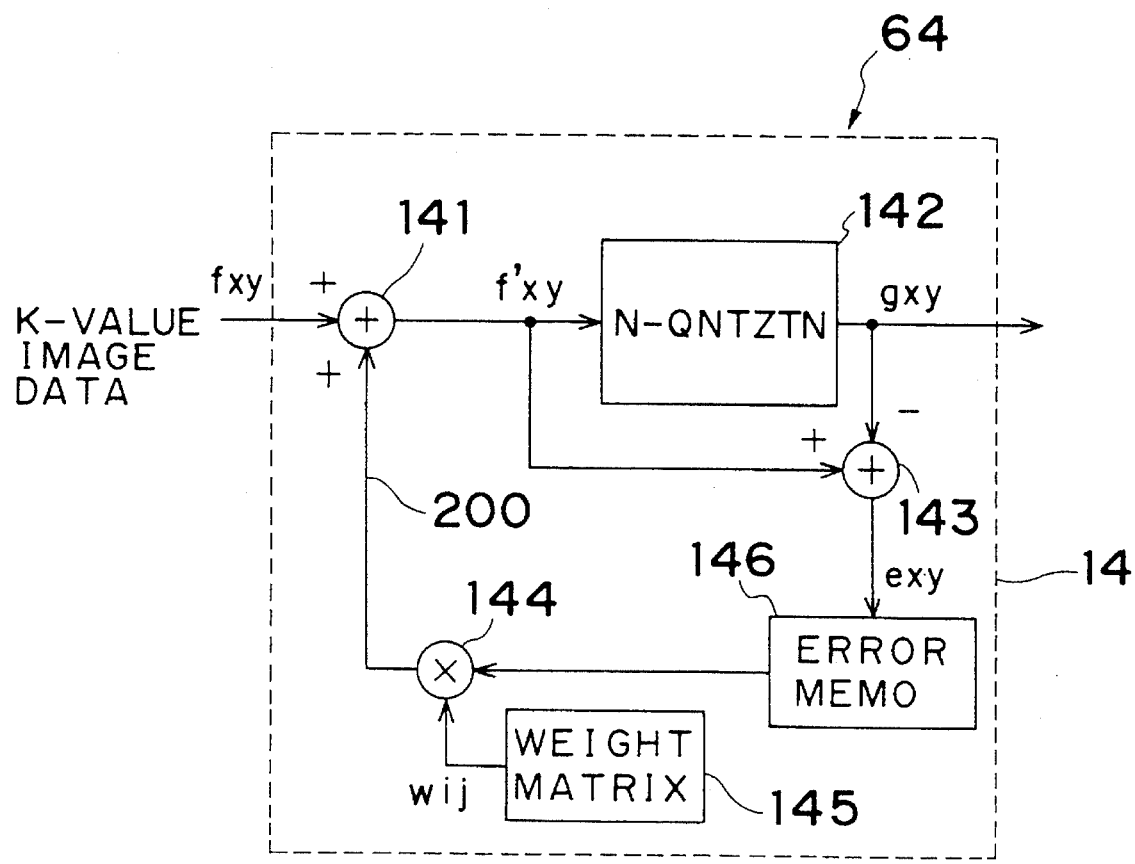
FIG. 10 is a block diagram of the N-value conversion circuit 64 in FIG. 6, FIGS. 11a, 11b and 11c show tables used to descried the error suppresser 110 in FIG. 6.

The operation of the N-value conversion circuit 64, which converts K-valued image data to N-valued image data (K>N) using an error diffusion processing method, is described next with reference to FIG. 10. FIG. 10 is a block diagram of the N-value conversion circuit 64.

As shown in FIG. 10, the K-valued image data fxy is added with the accumulated error Err surrounding the target pixel by the adder 141, which outputs the sum f'xy. This f'xy signal is quantized to N-valued data by comparison with plural predetermined threshold values by the N-quantization circuit 142, resulting in output gxy. The adder 143 obtains exy where exy=f'xy-gxy. This quantization error exy is diffused to the pixels surrounding the target pixel using a known weighting coefficient, and is stored in the error memory 146. The multiplier 144 multiplies the weighting coefficient of the weight matrix Wij by the error value e diffused to the surrounding pixels, and outputs the accumulated error Err. The multiplier 144 output signal 200 is thus defined as $$Err = \Sigma'e\ (x+i,\ y+j) \times Wij.$$

For example, if N=8, then gxy is output with the eight values 0, 1, 2, 3, 4, 5, 6, 7, and the K-valued image data is converted to N-valued image data.

This N-valued image data gxy is stored in the memory 65. As a result, the effects of a systematic dither matrix, e.g., block distortion, that appear when N-valued image data is quantized to L levels (where N<L) using a dither method are suppressed.

In images that are N-quantized using a systematic dither method from K-valued image data, the matrix size of the systematic dither method used for N-quantizing of K-valued image data increases as the number of required gradations increases, and image deterioration of gray level contour lines increases. (Image deterioration is particularly high in the digitizing process.) If the matrix size is reduced to emphasize contours, however, the number of gradations decreases, and pseudo-edges appear in halftone areas. As a result, when an image is converted to multivalued halftone levels from a systematic dithering method, the error between the K-valued image data and the multivalued image increases.

As a result, if an image is converted to a given multivalued image from image data stored with density information using the N-valued image data gxy generated by the N-value conversion circuit 64 shown in FIG. 10, loss of edge component information is reduced, and image resolution can be balanced with image halftoning without producing false edge lines.

The operation of the error suppresser 110 is described next with reference to FIGS. 11a–11d, which illustrates the error suppresser 110 in FIG. 6.

Figures 11A, 11B, 11C, 11D:
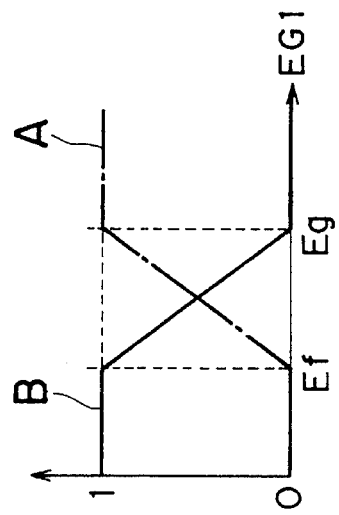
FIG. 11d is an operating diagram of the mixing circuit 113 in FIG. 6.

The edge detection circuit 111 is a filter having weighting coefficients as shown in FIG. 11a. Assuming a target pixel of $P(i,j)$, the output signal EG1 can be obtained by applying equation [19].

$$Wc = P(i-2,j-2) + P(i-2,j-1) + P(i-2,j) +$$
$$P(i-2,j+1) + P(i-2,j+2)$$
$$+ P(i-1,j-2) + P(i-1,j-1) + P(i-1,j) +$$
$$P(i-1,j+1) + P(i-1,j+2)$$
$$- P(i+1,j-2) + P(i+1,j-1) - P(i+1,j) -$$
$$P(i+1,j+1) - P(i+1,j+2)$$
$$- P(i+2,j-2) + P(i+2,j-1) - P(i+2,j) -$$
$$P(i+2,j+1) - P(i+2,j+2)$$

$$Wd = P(i-2,j+2) + P(i-1,j+2) + P(i,j+2) +$$
$$P(i+1,j+2) + P(i+2,j+2)$$
$$+ P(i-2,j+1) + P(i-1,j+1) + P(i,j+1) +$$
$$P(i+1,j+1) + P(i+2,j+1)$$
$$- P(i-2,j-1) - P(i-1,j-1) - P(i,j-1) -$$
$$P(i+1,j+1) - P(i+2,j-1)$$
$$- P(i-2,j-2) - P(i-1,j-2) - P(i,j-2) -$$
$$P(i+1,j-2) - P(i+2,j-2)$$

$$EG1 = |Wc| + |Wd| \quad [19]$$

The edge enhancement circuit 112 is a filter which has weighting coefficients as shown in FIG. 11b. Assuming a target pixel of $P(i,j)$, the output signal EE can be obtained by applying equation [20]. If the predetermined maximum value of the signal is Max, any value exceeding Max is clipped to Max, and if EE<0, then EE is set equal to zero.

$$EE = 5 \times P(i,j) - P(i-j-2) - P(i-j+2) - P(i+j-2) - P(i+j+2) \quad [20]$$

The mixing circuit 113 mixes the signal EE output from the edge enhancement circuit 112 with the input image data Data to generate and output the K-valued image data. The signals EE and Data input to the mixing circuit 113 are operated on as shown in equation [21] based on the mixing ratio set by the image quality controller 62 (CONT1) and the output EG1 from the edge detection circuit 111 as shown in FIG. 11c. The resulting output signal X is input to the N-value conversion circuit 64. It is to be noted that Ef<Eg in the following equation.

$$X = (1-Xe) \times Data + Xe \times EE$$

$$Xe = (EG1 - Ef)/(Eg - Ef)$$

IF $EG1 \leq Ef$, THEN $EG1 = Ef$

IF $EG1 \geq Eg$, THEN $Eg1 = Eg$ \quad [21]

The error suppresser 110 thus emphasizes the edge components in the image without emphasizing noise in halftone areas of the input image data, and outputs the K-valued image data. Because this is performed before the N-value conversion circuit 64 converts the K-valued image data to N-valued image data (K>N) using error diffusion, diffusion of quantization error at the edge components can be suppressed. As a result, the sharpness of the edge components in light text and fine line patterns converted to N-valued image data improves. Separation of edge areas requiring good resolution is also simpler, and separating precision improves.

The resolution can also be continuously adjusted because the image quality controller 62 controls the comparative values Ef, Eg used in the mixing circuit 113. The amount of input image data output signal Data in the mixed signal can be increased by increasing the values of Ef and Eg, resulting in a relative reduction in contour emphasis. By decreasing the values of Ef and Eg, the ratio of the edge enhancement circuit 112 output signal EE in the mixed signal increases, resulting in a relative increase in contour emphasis. Image resolution can also be precisely adjusted by controlling the difference (Eg–Ef). If the difference (Eg–Ef) is zero, the mixing circuit 113 performs a simple selection operation.

The keyboard 63 outputs the entered resolution setting to the image quality controller 52. The image quality controller 62 is, for example, a CPU or other microprocessor which calculates the comparative values Ef, Eg used by the mixing circuit 113, and outputs the result as signal CONT1. The resolution can be continuously adjusted in the mixing circuit 113 by regulating the signal CONT1.

Continuous adjustment of image resolution is thus possible by mixing the image quality controller 62 output signal EE and the input image data Data in the mixing circuit 113 according to the edge detection circuit 111 output signal EG1.

The third embodiment of a method and apparatus for converting halftone images according to the invention is described below. The halftone conversion processing apparatus of the third embodiment is constructed identically to the first embodiment, and is shown in FIG. 1a.

What differs between this third embodiment and the first is the operating method of the first, second, and third normalization circuits 2, 4, and 6, and the mixing circuit 7.

These differences are described in detail below, starting with the first, second, and third normalization circuits 2, 4, and 6.

Normalization to SCx (where $0 \leq SCx \leq 1$) is based on equation [22] where the input value to the first, second, and third normalization circuits 2, 4, and 6 is SGx, and the maximum possible input value is the value Mx obtained from equation [4] above.

$$SCx = SGx/Mx \quad [22]$$

It is to be noted that the conversion from SGx to SCx can be computed by the CPU based on equation [5] to build a look-up table (LUT) of SGx - SCx correspondence values or an operating circuit.

When the input values of the addition operations are normalized to image data of values between 0 and 1 by applying equations [4] and [22], the input value SG1 of the first normalization circuit 2 is normalized to the output value SC1 according to equation [23], the input value SG2 of the second normalization circuit 4 is normalized to the output value SC2 according to equation [24], and the input value SG3 of the third normalization circuit 6 is normalized to the output value SC3 according to equation [25]. The values Ma, Mb, and Mc are the maximum values of the three input values SG1, SG2, and SG3, respectively.

$$SC1 = SG1/Ma \quad [23]$$

$$SC2 = SG2/Mb \quad [24]$$

$$SC3 = SG3/Mc \quad [25]$$

If the values Ma=20, Mb=15, and Mc=9 are assumed in this embodiment, and the output values SC1, SC2, and SC3 are calculated for the input values SG1, SG2, SG3, the resulting values are input to the mixing circuit 7 as image data from 0–1.

The value of the weighting coefficients in the first, second, and third evaluation circuits 1, 3, and 5 can be a negative, zero, or positive non-integer (real number) value. Pixels with a coefficient of zero cause the input value to be multiplied by zero, resulting in a zero value being added. If the returned sum is negative, it is treated as zero, and the maximum values are processed to a value as defined by equation [4].

The weighting coefficients and size of the added areas are determined during the design stage with consideration given to the image quality required from the N-valued image data and M-valued image data, or more specifically according to the characteristics of the required spatial falters. As a result, different area sizes can be used even though the same area size is used in this embodiment. It is possible to change the smoothing of the input image data (i.e., the smoothing characteristics of the spatial filter) by changing the weighting coefficients and size of the added areas.

The operation of the mixing circuit 7 is described next with reference to FIG. 3.

The mixing circuit 7 weights and adds the input signals 102, 104, and 106 using the mixing weight shown in FIG. 3 to mix the signals based on the signal 107 from the feature extraction circuit 8, and outputs the mixed image data signal 108.

This mixing operation is based on equation [26] where the input signals 102, 104, and 106 are expressed as SC1, SC2, and SC3, the edge feature value input signal 107 is EGo, the output signal after the mixing operation is X, and the number of gradations reproducible by the output device is $$
\begin{aligned}
&\text{IF} \quad 0 \leq EGo \leq EGm, \quad [26]\\
&\quad \text{THEN} \quad X = ((1-Xa) \times SC3 + Xa \times SC2) \times (Q-1)\\
&\qquad Xa = EGo / EGm\\
&\text{ELSE IF} \quad EGm < EGo,\\
&\quad \text{THEN} \quad X = ((1-Xb) \times SC2 + Xb \times SC1) \times (Q-1)\\
&\qquad Xb = (EGo - EGm) / (EGn - EGm)\\
&\text{IF} \quad EGn \leq EGo, \text{ THEN } EGo = EGn.
\end{aligned}
$$

The signal mixed according to equation [26] is eventually converted to Q-halftone image data according to the output device, and the data is output as signal 108. For example, if Q=128, the resulting image data will have 128 gradations. Conversion to integer values can be achieved by the operation Xout=[X] where [] represents a nearest-integer rounding operation.

According to this third embodiment of the invention, it is therefore possible to generate interpolated image data with the optimum number of gradations for the output device no matter how many gradations the output device is capable of handling by simply controlling the number of gradations Q.

In addition, a single operating circuit can be used for self-adaptive connection of plural output devices capable of handling different numbers of gradations, and the operating circuit can thus be shared by plural devices.

It is therefore possible to adjust the image quality and convert to an optimum number of gradation levels both edge lines and halftone areas of an image using the methods and apparatuses for converting halftone images according to the first, second, and third embodiments of the invention described above.

The generated halftone image data can be generated at the single pixel level or in block units with the same interpolation effect obtained. This is because the selection process is executed more continuously and the effects of recognition errors can be suppressed to an extremely low level when compared with the methods of the prior art.

By applying the method of the invention to photocopiers, printers, display devices, facsimiles, and other image processing devices, the image data quantity can be is reduced while achieving high definition, high quality output, display, and transmission. When applied in color output devices, displays, or facsimile machines, the image data quantity can be further reduced while retaining image quality.

Finally, it is to be noted that the method and apparatus for converting halftone images according to the first, second, and third embodiments of the invention can be achieved in software using a CPU or other microprocessor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A halftone image data signal processing apparatus comprising:

memory means for receiving and storing half tone image data signals corresponding to a plurality of pixels, each pixel corresponding to an N-valued data value;

first evaluation means for evaluating a contrast level of a target pixel stored in said memory means as one of said image data signals by weighting said target pixel by a first predetermined amount and gathering data of pixels represented by further ones of said image data signals surrounding said target pixel, and for generating a first evaluation signal indicative of contrast evaluation of said target pixel, said first evaluation signal being M-valued data, wherein M is greater than N;

second evaluation means for evaluating a contrast level of said target pixel stored in said memory means as said one of said image data signals by weighting said target pixel by a second predetermined amount, less than said first predetermined amount, and gathering data of pixels represented by said further ones of said image data signals surrounding said target pixel, and for generating a second evaluation signal indicative of contrast evaluation of said target pixel, said second evaluation signal corresponding to an M-valued data value;

feature extraction means for locating pixels corresponding to image features at an area surrounding said target pixel, for receiving and evaluating image data signals corresponding to said pixels to detect whether or not an image formed by said pixels at said surrounding area contains an edge component, and for generating an edge appearance signal indicative of degree of appearance of the image to be an edge component at said surrounding area; and mixer means for receiving said edge appearance signal and for receiving and mixing said first and second evaluation signals at a ratio determined by said edge appearance signal such that said first evaluation signal is mixed at a higher rate than said second evaluation signal as the edge appearance signal increases to generate a plurality of processed half tone image data signals, said mixer means further comprises quantizing means for quantizing the mixed data having a value between zero and M to a further data value having a value between zero and L, wherein L is equal to or greater than M.

2. A halftone image converting apparatus as claimed in claim 1, further comprising:

third evaluation means for evaluating a contrast level of said target pixel stored in said memory means by weighting said target pixel by a third predetermined amount, less than said second predetermined amount, and gathering data of pixels surrounding said target pixel, and for producing a third evaluation signal indicative of contrast evaluation of said target pixel, said third evaluation signal being M-valued data; and said mixer means for mixing said second and third evaluation signals at a ratio determined by said edge appearance signal such that said third evaluation signal is mixed at a higher rate than said second evaluation signal as the edge appearance signal decreases.

3. A halftone image converting apparatus as claimed in claim 1, wherein each of said first and second evaluation means further comprises normalization means for normalizing the first and second evaluation signals.

4. A halftone image converting apparatus as claimed in claim 1, wherein said feature extraction means comprises at least a first pair of filtering means comprising:

a first filtering means for filtering the edge component extending in a first direction within a first predetermined area surrounding said target pixel;

and a second filtering means for filtering the edge component extending in a second direction orthogonal to the first direction within said first predetermined area.

5. A halftone image converting apparatus as claimed in claim 4, wherein said feature extraction means further comprises an additional pair of filtering means comprising:

a third filtering means for filtering the edge component extending in a first direction within a second predetermined area surrounding said target pixel;

and a fourth filtering means for filtering the edge component extending in a second direction orthogonal to the first direction within said second predetermined area.

6. A halftone image converting apparatus as claimed in claim 5, wherein said second predetermined area has a size different from said first predetermined area.

7. A halftone image converting apparatus as claimed in claim 6, wherein said first and third filtering means each have respectively different frequencies and said second and fourth filtering means each have respectively different frequencies.

8. A halftone image converting apparatus as claimed in claim 4, wherein said feature extraction means further comprises second, third, fourth and fifth pairs of filtering means for filtering second, third, fourth and fifth predetermined areas which are located partly overlapping with said first predetermined area and surrounding said first predetermined area.

9. A halftone image converting apparatus as claimed in claim 1, wherein said feature extraction means comprises at least two pair of filtering means, in which the first pair of filtering means comprises:

a first filtering means for filtering the edge component extending in a first direction within a first predetermined area surrounding said target pixel;

a second filtering means for filtering the edge component extending in a second direction orthogonal to the first direction within said first predetermined area; and a combining means fox combining signals obtained from said first and second filtering means to produce a first provisional edge appearance signal; and the second pair of filtering means comprises:

a third filtering means for filtering the edge component extending in a first direction within a second predetermined area surrounding said target pixel, said second predetermined area being greater than said first predetermined area;

a fourth filtering means for filtering the edge component extending in a second direction orthogonal to the first direction within said second predetermined area; and a combining means for combining signals obtained from said third and fourth filtering means to produce a second provisional edge appearance signal.

10. A halftone image converting apparatus as claimed in claim 9, wherein said mixer means further comprises adding means for adding said first and second provisional edge appearance signals at a preselected ratio to obtain said edge appearance signal.

11. A halftone image converting apparatus as claimed in claim 10, further comprising setting means for setting said preselected ratio.

12. The halftone image data signal processing apparatus of claim 1, wherein the quantizing means includes a look up table for processing variable gradations in the mixed data.

13. A method of processing halftone image data signals to display an image with converted gradation corresponding to said data signals comprising the steps of (a) storing, in a memory, halftone image data signals corresponding to a plurality of pixels each pixel corresponding to a N-valued data value;

(b) evaluating a contrast level of a target pixel stored in said memory as one of said image data signals by weighting said target pixel by a first predetermined amount and gathering data of pixels represented by further ones of said image data signals surrounding said target pixel, and for generating a first evaluation signal indicative of contrast evaluation of said target pixel, said first evaluation signal corresponding to an M-valued data value, wherein M is greater than N;

(c) evaluating a contrast level of said target pixel stored in said memory as one of said image data signals by weighting said target pixel by a second predetermined amount, less than said first predetermined amount, and gathering data of pixels represented by said further ones of said image data signals surrounding said target pixel, and for generating a second evaluation signal indicative of contrast evaluation of said target pixel, said second evaluation signal corresponding to an M-valued data value;

(d) locating pixels corresponding to image features at an area surrounding said target pixel, for evaluating image data signals corresponding to said pixels to detect whether or not an image formed by said pixels at said surrounding area contains an edge component, and for generating an edge appearance signal indicative of degree of appearance of the image to be an edge component at said surrounding area;

(e) receiving said edge appearance signal and receiving and mixing said first and second evaluation signals at a ratio determined by said edge appearance signal such that said first evaluation signal is mixed at a higher rate than said second evaluation signal as the edge appearance signal increases;

(f) quantizing the mixed data having a value between zero and M to a data having a value between zero and L, wherein L is equal to or greater than M to generate a plurality of processed halftone image data signals; and (g) displaying said image with converted gradation on a display device using said plurality of processed halftone image data signals.

14. A method of processing halftone image data signals according to claim 13, further comprising the step of quantizing the mixed data through a look up table in order to process variable gradations in the mixed data.

* * * * *

UNITED STATES PATENT AND TRADEMARK OFFICE
CERTIFICATE OF CORRECTION

PATENT NO.  : 5,454,052
DATED       : September 26, 1995
INVENTOR(S) : Kojima

It is certified that error appears in the above-identified patent and that said Letters Patent is hereby corrected as shown below:

Column 22, line 33, delete "fox" and insert --for--.

Signed and Sealed this

Nineteenth Day of March, 1996

Attest:

BRUCE LEHMAN

Attesting Officer  Commissioner of Patents and Trademarks